(12) United States Patent
Lou et al.

(10) Patent No.: US 11,656,437 B2
(45) Date of Patent: May 23, 2023

(54) OPTICAL IMAGING SYSTEM INCLUDING SIX LENSES OF −−++−+ REFRACTIVE POWERS

(71) Applicant: Zhejiang Sunny Optical Co., Ltd, Zhejiang Province (CN)

(72) Inventors: Qiqi Lou, Zhejiang Province (CN); Fujian Dai, Zhejiang Province (CN); Liefeng Zhao, Zhejiang Province (CN)

(73) Assignee: ZHEJIANG SUNNY OPTICAL CO., LTD., Zhejiang Province (CN)

( * ) Notice: Subject to any disclaimer, the term of this patent is extended or adjusted under 35 U.S.C. 154(b) by 296 days.

(21) Appl. No.: 16/940,551

(22) Filed: Jul. 28, 2020

(65) Prior Publication Data

US 2021/0048635 A1   Feb. 18, 2021

(30) Foreign Application Priority Data

Aug. 12, 2019   (CN) .......................... 201910740929.0

(51) Int. Cl.
| | | |
|---|---|---|
| *G02B 13/00* | (2006.01) | |
| *G02B 9/62* | (2006.01) | |
| *G02B 13/06* | (2006.01) | |

(52) U.S. Cl.
CPC ........... *G02B 13/0045* (2013.01); *G02B 9/62* (2013.01); *G02B 13/06* (2013.01)

(58) Field of Classification Search
CPC ....... G02B 13/0045; G02B 9/62; G02B 13/06
See application file for complete search history.

(56) References Cited

U.S. PATENT DOCUMENTS

| | | | | |
|---|---|---|---|---|
| 2018/0188489 | A1* | 7/2018 | Chang | ................ G02B 13/0045 |
| 2018/0196233 | A1* | 7/2018 | Chang | .................... G02B 13/18 |
| 2018/0329180 | A1* | 11/2018 | Nakamura | ............. G02B 13/06 |
| 2018/0341089 | A1* | 11/2018 | Nakamura | ............... G02B 9/62 |
| 2019/0094498 | A1* | 3/2019 | Liao | ....................... G02B 13/02 |
| 2019/0129146 | A1* | 5/2019 | Wu | ..................... G02B 13/0045 |

(Continued)

FOREIGN PATENT DOCUMENTS

| | | |
|---|---|---|
| CN | 109709662 A | 5/2019 |
| CN | 109799598 A | 5/2019 |

OTHER PUBLICATIONS

Indian First Examination Report dated May 28, 2021, in connection with Indian Application No. 202014032469.

*Primary Examiner* — Wen Huang
(74) *Attorney, Agent, or Firm* — Norris McLaughlin, P.A.

(57) ABSTRACT

The present disclosure discloses an optical imaging system including, sequentially from an object side to an image side along an optical axis, a first lens having negative refractive power with a convex object-side surface; a second lens having negative refractive power; a third lens having positive refractive power; a fourth lens having positive refractive power; a fifth lens having negative refractive power; and a sixth lens having positive refractive power. A maximum field-of-view FOV of the optical imaging system and a distance TTL along the optical axis from the object-side surface of the first lens to an imaging plane of the optical imaging system satisfy $\tan(FOV/2)/TTL > 1.0 \text{ mm}^{-1}$. A center thickness CT1 of the first lens along the optical axis and a center thickness CT4 of the fourth lens along the optical axis satisfy $0.9 \leq CT1/CT4 < 1.5$.

17 Claims, 24 Drawing Sheets

(56) References Cited

U.S. PATENT DOCUMENTS

| | | |
|---|---|---|
| 2019/0243095 A1* | 8/2019 | Chang ..................... G02B 7/09 |
| 2020/0150384 A1 | 5/2020 | Xu |
| 2020/0257091 A1 | 8/2020 | Huang et al. |

* cited by examiner

OPTICAL IMAGING SYSTEM INCLUDING SIX LENSES OF −−++−+ REFRACTIVE POWERS

CROSS-REFERENCE TO RELATED APPLICATION

This application claims benefit of priority to Chinese Patent Application No. 201910740929.0 filed on Aug. 12, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including six lenses.

BACKGROUND

As market demands continue to change, ultra-wide-angle imaging systems are increasingly used in fields such as surveillance, military, and virtual reality. However, the problems of large aberration and low pixels in the ultra-wide-angle imaging system severely limit the application of the ultra-wide-angle imaging system in the fields of industry and daily life.

In order to meet the requirements of miniaturization and imaging requirements, an optical imaging system that may simultaneously satisfy the characteristics of miniaturization, ultra-wide-angle, and high pixels is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having negative refractive power, and an object-side surface thereof may be a convex surface; a second lens having negative refractive power; a third lens having positive refractive power; a fourth lens having positive refractive power; a fifth lens having negative refractive power; and a sixth lens having positive refractive power.

In one embodiment, a maximum field-of-view FOV of the optical imaging system and a distance TTL along the optical axis from the object-side surface of the first lens to an imaging plane of the optical imaging system may satisfy $\tan(FOV/2)/TTL > 1.0 \text{ mm}^{-1}$.

In one embodiment, a center thickness CT1 of the first lens along the optical axis and a center thickness CT4 of the fourth lens along the optical axis may satisfy $0.9 \leq CT1/CT4 < 1.5$.

In one embodiment, an effective focal length f1 of the first lens and an effective focal length f2 of the second lens may satisfy $2.5 < f1/f2 < 8.0$.

In one embodiment, an effective focal length f of the optical imaging system and an effective focal length f1 of the first lens may satisfy $-0.3 < f/f1 < 0$.

In one embodiment, an effective focal length f of the optical imaging system and an effective focal length f3 of the third lens may satisfy $0 < f/f3 < 0.4$.

In one embodiment, an effective focal length f4 of the fourth lens and an effective focal length f6 of the sixth lens may satisfy $1.4 \leq f6/f4 < 2.5$.

In one embodiment, the first lens may be made of glass material, and a refractive index N1 of the first lens may satisfy $N1 \geq 1.70$.

In one embodiment, a combined focal length f45 of the fourth lens and the fifth lens and an effective focal length f3 of the third lens may satisfy $0 < f45/f3 < 1.5$.

In one embodiment, a spaced interval T23 between the second lens and the third lens along the optical axis and a spaced interval T12 between the first lens and the second lens along the optical axis may satisfy $1.0 < T23/T12 < 2.0$.

In one embodiment, a radius of curvature R7 of an object-side surface of the fourth lens and a radius of curvature R8 of an image-side surface of the fourth lens may satisfy $|(R7+R8)/(R7-R8)| \leq 0.1$.

In one embodiment, an effective focal length f of the optical imaging system and a radius of curvature R11 of an object-side surface of the sixth lens may satisfy $f/R11 \leq 1.0$.

In one embodiment, an on-axis distance SAG12 from an intersection of an image-side surface of the first lens and the optical axis to a vertex of a maximum effective half-aperture of the image-side surface of the first lens and an edge thickness ET1 of the first lens may satisfy $0.7 \leq SAG12/ET1 < 1.3$.

The present disclosure employs six lenses, and the optical imaging system has at least one advantageous effect such as miniaturization, ultra-wide-angle, high pixels and the like by rationally matching the lenses of different materials and rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
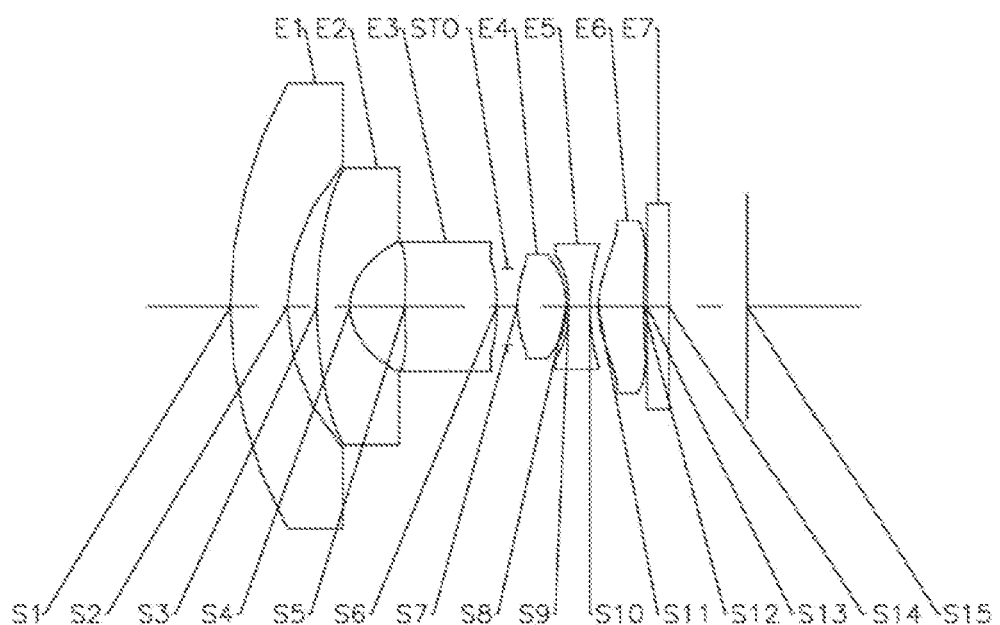
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, six lenses having refractive power, that is, a first lens, a second lens, a third lens, a fourth lens, a fifth lens and a sixth lens. The six lenses are arranged sequentially from an object side to an image side along an optical axis. Among the first lens to the sixth lens, there may be an air interval between each two adjacent lenses.

In an exemplary embodiment, the optical imaging system may include a front group and a rear group, the front group may include the first lens, the second lens, and the third lens, and the rear group may include the fourth lens, the fifth lens, and the sixth lens. Setting the front group and the rear group to match and setting both have their own emphasis is beneficial to improve the imaging quality of the optical imaging system.

In an exemplary embodiment, the first lens may have negative refractive power, an object-side surface thereof may be a convex surface; the second lens may have negative refractive power; the third lens may have positive refractive power; the fourth lens may have positive refractive power; the fifth lens may have negative refractive power; and the sixth lens may have positive refractive power. By reasonably controlling the positive and negative refractive power of each component of the system and the curvature of each lens's surface, the low-order aberration of the system may be effectively compensated.

In an exemplary embodiment, the optical imaging system according to the present disclosure may satisfy: $\tan(FOV/2)/TTL>1.0$ $mm^{-1}$, where FOV is a maximum field-of-view of the optical imaging system and TTL is a distance along the optical axis from the object-side surface of the first lens to an imaging plane of the optical imaging system. More specifically, FOV and TTL may satisfy: $1.2\ mm^{-1}<\tan(FOV/2)/TTL<1.8\ mm^{-1}$. Controlling the maximum field-of-view and the optical length of the optical imaging system makes the length of the optical imaging system along the optical axis shorter and at the same time enables the optical imaging system to have an ultra-wide-angle characteristic.

In an exemplary embodiment, the optical imaging system according to the present disclosure may satisfy: $0.9 \leq CT1/CT4<1.5$, where CT1 is a center thickness of the first lens along the optical axis and CT4 is a center thickness of the fourth lens along the optical axis. More specifically, CT1 and CT4 may satisfy: $0.92 \leq CT1/CT4 < 1.33$. Controlling the ratio of the center thickness of the first lens to the center thickness of the fourth lens is beneficial for the optical imaging system to converge the light beam, and at the same time, is beneficial to reduce the spherical aberration and coma of the optical imaging system, thereby improving the imaging quality of the optical imaging system.

In an exemplary embodiment, the optical imaging system according to the present disclosure may satisfy: $2.5 < f1/f2 < 8.0$, where f1 is an effective focal length of the first lens and f2 is an effective focal length of the second lens. More specifically, f1 and f2 may satisfy: $2.7 < f1/f2 < 7.8$. Controlling the ratio of the refractive power of the first lens to the refractive power of the second lens is beneficial to realize the ultra-wide-angle characteristic of the optical imaging system, and at the same time, to make the first lens have better processability.

In an exemplary embodiment, the optical imaging system according to the present disclosure may satisfy: $-0.3 < f/f1 < 0$, where f is an effective focal length of the optical imaging system and f1 is an effective focal length of the first lens. More specifically, f and f1 may satisfy: $-0.23 < f/f1 < -0.05$. By controlling the ratio of the effective focal length of the optical imaging system to the effective focal length of the first lens, the front group may better maintain the characteristic of negative refractive power while effectively share the ultra-wide-angle field-of-view.

In an exemplary embodiment, the optical imaging system according to the present disclosure may satisfy: $0 < f/f3 < 0.4$, where f is an effective focal length of the optical imaging system and f3 is an effective focal length of the third lens. More specifically, f and f3 may satisfy: $0.10 < f/f3 < 0.35$. Controlling the ratio of the effective focal length of the optical imaging system to the effective focal length of the third lens may effectively converge the light beam, and is beneficial to reduce the field curvature and distortion of the optical imaging system, thereby improving the imaging quality of the optical imaging system.

In an exemplary embodiment, the optical imaging system according to the present disclosure may satisfy: $1.4 \leq f6/f4 < 2.5$, where f4 is an effective focal length of the fourth lens and f6 is an effective focal length of the sixth lens. More specifically, f4 and f6 may satisfy: $1.45 \leq f6/f4 < 2.25$. By controlling the ratio of the effective focal length of the sixth lens to the effective focal length of the fourth lens, the rear group has a better ability to converge light, and the field curvature of the system is effectively reduced, thereby improving the imaging quality of the optical imaging system.

In an exemplary embodiment, the optical imaging system according to the present disclosure may satisfy: $N1 \geq 1.70$, where N1 is a refractive index of the first lens. As an example, the first lens is made of glass material. By controlling the refractive index of the first lens, the first lens may effectively share the ultra-wide-angle field-of-view. At the same time, the first lens made of glass material may make the first lens have better workability and is beneficial to maintain the strength of the first lens.

In an exemplary embodiment, the optical imaging system according to the present disclosure may satisfy: $0 < f45/f3 < 1.5$, where f45 is a combined focal length of the fourth lens and the fifth lens and f3 is an effective focal length of the third lens. More specifically, f45 and f3 may satisfy: $0.2 < f45/f3 < 1.3$. Matching the combined focal length of the fourth lens and the fifth lens with the refractive power of the third lens is beneficial to eliminate the chromatic aberration of the optical imaging system, thereby improving the performance of the optical imaging system.

In an exemplary embodiment, the optical imaging system according to the present disclosure may satisfy: $1.0 < T23/T12 < 2.0$, where T23 is a spaced interval between the second lens and the third lens along the optical axis and T12 is a spaced interval between the first lens and the second lens along the optical axis. More specifically, T23 and T12 may satisfy: $1.23 < T23/T12 < 1.89$. Controlling the ratio of the air intervals on both sides of the second lens is beneficial to assemble the first lens, the second lens, and the third lens, which is convenient for manufacturing the optical imaging system. In addition, controlling T23/T12 is also beneficial to eliminate the overall aberration of the optical imaging system, thereby improving the imaging quality of the optical imaging system.

In an exemplary embodiment, the optical imaging system according to the present disclosure may satisfy: $|(R7+R8)/(R7-R8)| \leq 0.1$, where R7 is a radius of curvature of an object-side surface of the fourth lens and R8 is a radius of curvature of an image-side surface of the fourth lens. More specifically, R7 and R8 may satisfy: $|(R7+R8)/(R7-R8)| \leq 0.09$. By controlling the radii of curvature of the two surfaces of the fourth lens to satisfy the aforementioned conditional expression, the object-side surface and the image-side surface of the fourth lens may be matched, so that the refractive power of the fourth lens may be balanced, and the rear group is beneficial to converge the light beam.

In an exemplary embodiment, the optical imaging system according to the present disclosure may satisfy: $f/R11 \leq 1.0$, where f is an effective focal length of the optical imaging system and R11 is a radius of curvature of an object-side surface of the sixth lens. More specifically, f and R11 may satisfy: $0.80 \leq f/R11 \leq 0.99$. By controlling the ratio of the effective focal length of the optical imaging system to the radius of curvature of the object-side surface of the sixth lens, the refractive power of the lens located at the object side of the sixth lens may be balanced, and the axial chromatic aberration and spherical aberration of the optical imaging system is advantageously eliminated.

In an exemplary embodiment, the optical imaging system according to the present disclosure may satisfy: $0.7 \leq SAG12/ET1 < 1.3$, where SAG12 is an on-axis distance from an intersection of an image-side surface of the first lens and the optical axis to a vertex of a maximum effective half-aperture of the image-side surface of the first lens and ET1 is an edge thickness at the maximum effective half-aperture of the first lens. More specifically, SAG12 and ET1 may satisfy: $0.71 \leq SAG12/ET1 < 1.27$. Controlling the ratio of the sagittal height of the image-side surface of the first lens to the edge thickness may make the first lens have better processability, and at the same time, is beneficial for the first lens to share the ultra-wide-angle field-of-view.

In an exemplary embodiment, the optical imaging system according to the present disclosure may satisfy: $0.8 \leq SAG22/R4 < 1.0$, where SAG22 is an on-axis distance from an intersection of an image-side surface of the second lens and the optical axis to a vertex of a maximum effective half-aperture of the image-side surface of the second lens and R4 is a radius of curvature of the image-side surface of the second lens. More specifically, SAG22 and R4 may satisfy: $0.81 \leq SAG22/R4 < 0.95$. Controlling the ratio of the sagittal height of the image-side surface of the second lens to the radius of curvature of the image-side surface of the second lens may effectively correct the off-axis aberration of the optical imaging system, and is beneficial for the second lens to share the ultra-wide-angle field-of-view.

In an exemplary embodiment, the optical imaging system described above may further include at least one stop. The stop may be disposed at an appropriate position as needed, for example, between the third lens and the fourth lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as six lenses as described above. By properly assigning the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as miniaturization, ultra-wide angle, and high resolution.

In the embodiments of the present disclosure, at least one surface of at least one lens is aspheric. For example, the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. In the embodiments of the present disclosure, either or both of the object-side surface and the image-side surface of the first lens may be spherical, and at least one of the object-side surface and the image-side surface of each of the second lens, the third lens, the fourth lens, the fifth lens, and the sixth lens may be aspheric. Optionally, the object-side surface and the image-side surface of each of the second lens, the third lens, the fourth lens, the fifth lens and the sixth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking six lenses as an example, the optical imaging system is not limited to include six lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Spherical | 4.5216 | 0.5500 | 1.74 | 52.3 | −5.33 | 0.0000 |
| S2 | Spherical | 2.0223 | 0.2880 | | | | 0.0000 |
| S3 | Aspheric | 3.8587 | 0.3200 | 1.54 | 56.1 | −1.12 | 0.0000 |
| S4 | Aspheric | 0.5130 | 0.5316 | | | | −0.6526 |
| S5 | Aspheric | 4.1732 | 0.8869 | 1.62 | 23.5 | 2.70 | 12.3102 |
| S6 | Aspheric | −2.7437 | 0.1035 | | | | −3.9388 |
| STO | Spherical | Infinite | 0.0955 | | | | |
| S7 | Aspheric | 0.9464 | 0.4746 | 1.54 | 56.1 | 0.94 | −3.1926 |
| S8 | Aspheric | −0.9306 | 0.0250 | | | | 1.3372 |
| S9 | Aspheric | −1.3280 | 0.2000 | 1.65 | 19.2 | −1.05 | −0.9040 |
| S10 | Aspheric | 1.6305 | 0.0836 | | | | −2.4605 |
| S11 | Aspheric | 0.7577 | 0.4405 | 1.54 | 56.1 | 1.63 | −6.9160 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | 4.0344 | 0.0328 | | | | −3.1595 |
| S13 | Spherical | Infinite | 0.2100 | 1.52 | 64.2 | | |
| S14 | Spherical | Infinite | 0.7581 | | | | |
| S15 | Spherical | Infinite | | | | | |

In example 1, an effective focal length f of the optical imaging system is 0.74 mm, an on-axis distance TTL from the object-side surface S1 of the first lens E1 to the imaging plane S15 is 5.00 mm, and a maximum field-of-view FOV is 166.0°.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14 and A16 applicable to each aspheric surface S3 to S12 in example 1.

TABLE 2

| Surface number | A4 | A6 | A8 | A10 | A12 | A14 | A16 |
|---|---|---|---|---|---|---|---|
| S3 | −3.3063E−02 | 4.2630E−02 | −2.1838E−02 | 5.6837E−03 | 0.0000E+00 | 0.0000E+00 | 0.0000E+00 |
| S4 | 6.9420E−02 | −1.1372E+00 | 9.0197E+00 | −3.7025E+01 | 8.1495E+01 | −7.4836E+01 | 0.0000E+00 |
| S5 | −5.0092E−01 | −4.3700E−01 | −7.9651E−01 | 2.8879E+00 | 0.0000E+00 | 0.0000E+00 | 0.0000E+00 |
| S6 | −6.4018E−01 | −1.9718E+00 | 4.3719E+01 | −2.5708E+02 | 7.4755E+02 | −8.4529E+02 | 0.0000E+00 |
| S7 | −2.4763E−01 | −1.7011E+00 | 2.9821E+01 | −1.5349E+02 | 2.4931E+02 | 0.0000E+00 | 0.0000E+00 |
| S8 | −5.0852E−01 | −4.3497E+00 | 6.6689E+01 | −2.7325E+02 | 3.9428E+02 | 0.0000E+00 | 0.0000E+00 |
| S9 | −2.8678E−02 | −7.8071E+00 | 3.0495E+01 | 2.4379E+02 | −2.6790E+03 | 8.7700E+03 | −9.6853E+03 |
| S10 | −4.7011E−01 | 3.2734E+00 | −1.5844E+01 | 5.5906E+01 | −1.5097E+02 | 2.5341E+02 | −1.7835E+02 |
| S11 | −1.7866E−01 | 1.4226E+00 | −6.0892E+00 | 1.5383E+01 | −2.4670E+01 | 1.9957E+01 | −5.5561E+00 |
| S12 | −3.0350E−01 | 2.6986E−01 | −1.8157E−01 | −2.6469E−01 | −1.8716E−01 | 2.4297E−01 | 0.0000E+00 |

Figure 2A:
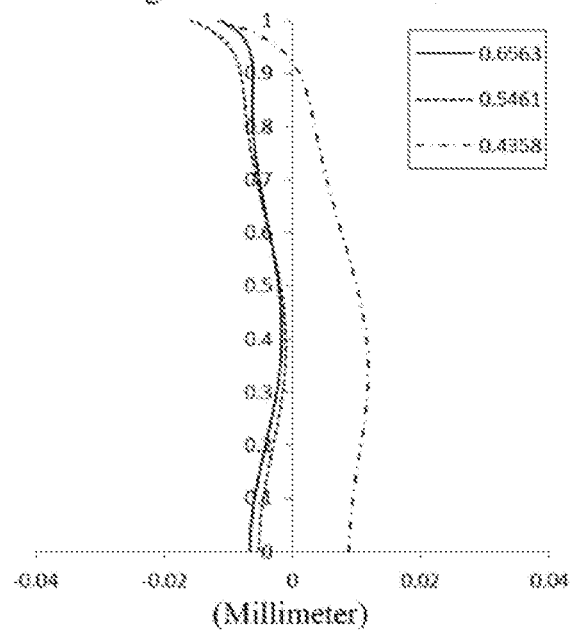
FIGS. 2A to 2D illustrate a longitudinal aberration curve, an astigmatic curve, an f-θ distortion curve, and a relative illumination curve of the optical imaging system of the Example 1, respectively.
Figure 2B:
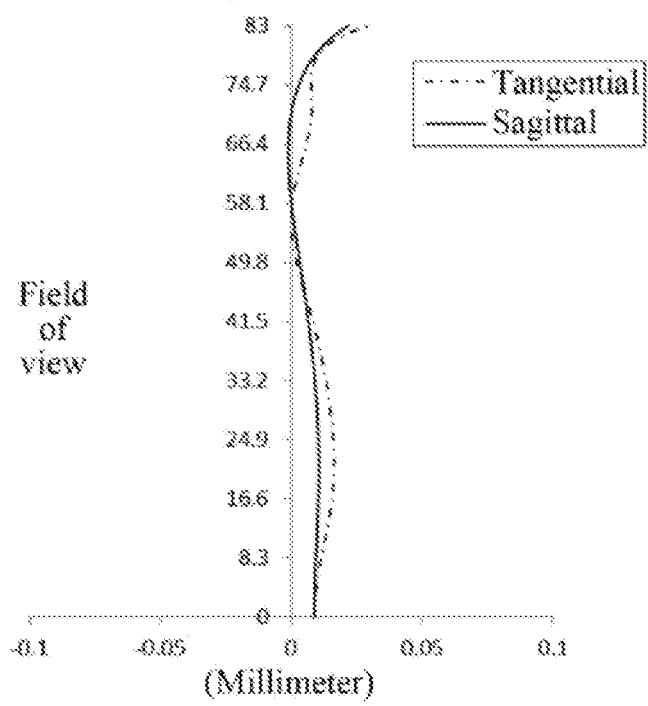
Figure 2C:
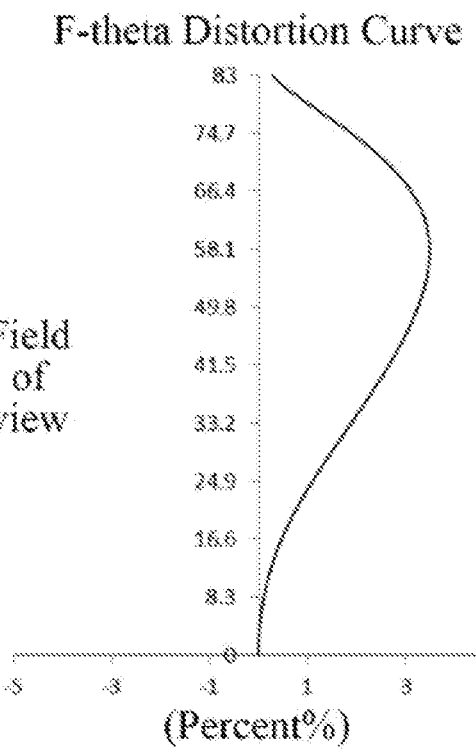
Figure 2D:
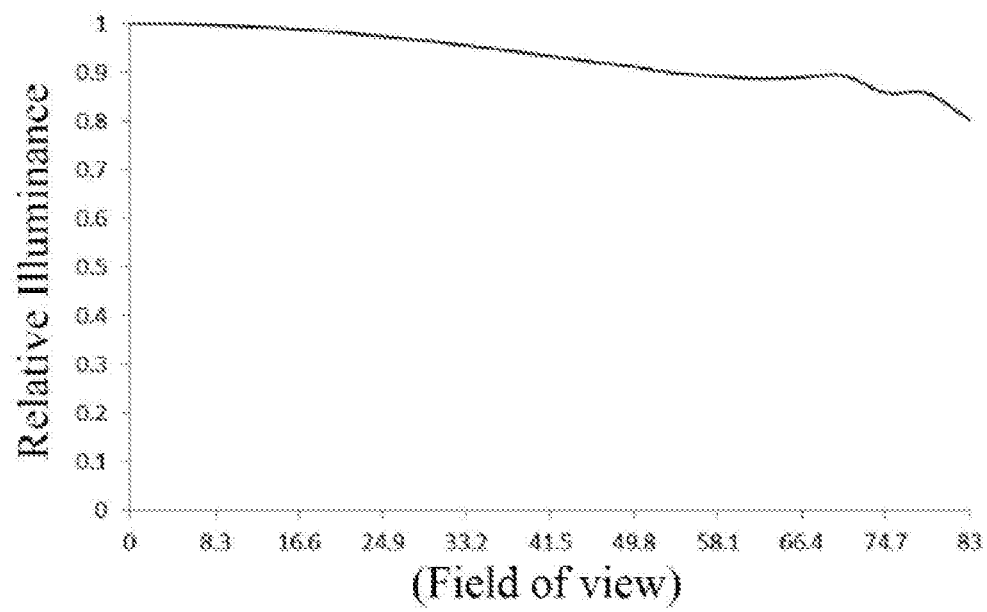

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates an f-θ distortion curve of the optical imaging system according to example 1, representing amounts of distortion corresponding to different field-of-views. FIG. 2D illustrates a relative illumination curve of the optical imaging system according to example 1, representing relative illumination at different field-of-views. It can be seen from FIG. 2A to FIG. 2D that the optical imaging system provided in example 1 may achieve good image quality.

Example 2

Figure 3:
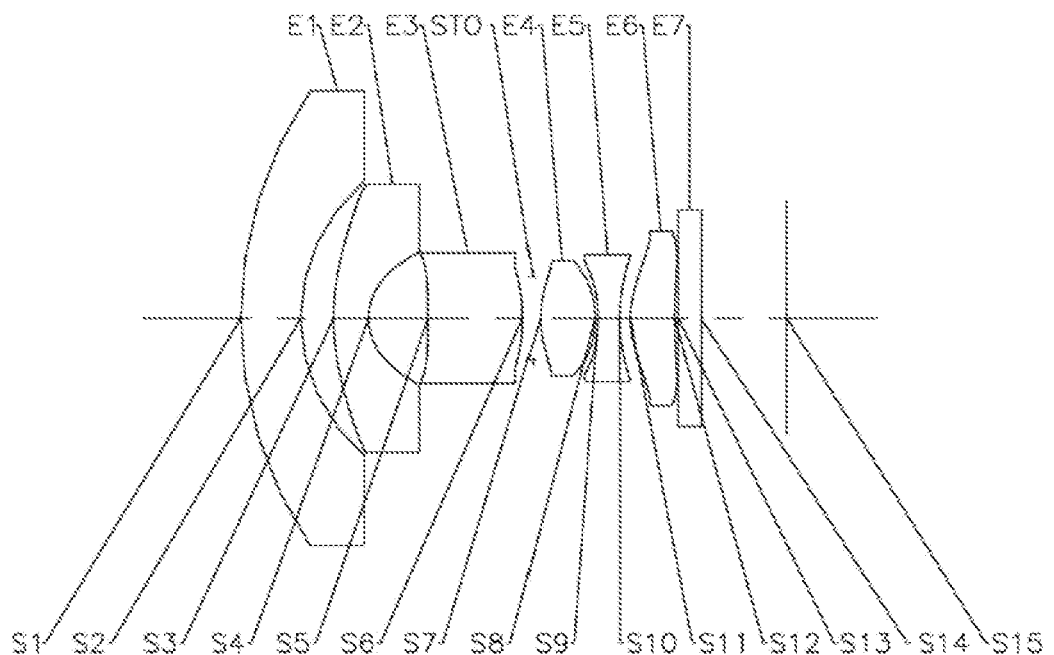
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 2, an effective focal length f of the optical imaging system is 0.74 mm, an on-axis distance TTL from the object-side surface S1 of the first lens E1 to the imaging plane S15 is 5.00 mm, and a maximum field-of-view FOV is 162.0°.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 3.7704 | 0.5500 | 1.74 | 52.3 | −4.41 | 0.0000 |
| S2 | Spherical | 1.6603 | 0.3014 | | | | 0.0000 |
| S3 | Aspheric | 2.2425 | 0.3200 | 1.54 | 56.1 | −1.30 | 0.0000 |
| S4 | Aspheric | 0.5130 | 0.5454 | | | | −0.6125 |
| S5 | Aspheric | −80.0000 | 0.8661 | 1.62 | 23.5 | 3.19 | −73.9931 |
| S6 | Aspheric | −2.0189 | 0.0910 | | | | −6.2595 |
| STO | Spherical | Infinite | 0.0701 | | | | |
| S7 | Aspheric | 0.9623 | 0.4993 | 1.54 | 56.1 | 0.98 | −3.1387 |
| S8 | Aspheric | −0.9789 | 0.0250 | | | | 1.2202 |
| S9 | Aspheric | −1.6150 | 0.2000 | 1.65 | 19.2 | −1.09 | 0.0072 |
| S10 | Aspheric | 1.4307 | 0.0964 | | | | −2.5883 |
| S11 | Aspheric | 0.7724 | 0.4078 | 1.54 | 56.1 | 1.66 | −7.3408 |
| S12 | Aspheric | 4.2370 | 0.0328 | | | | 7.9271 |
| S13 | Spherical | Infinite | 0.2100 | 1.52 | 64.2 | | |
| S14 | Spherical | Infinite | 0.7846 | | | | |
| S15 | Spherical | Infinite | | | | | |

TABLE 4

| Surface number | A4 | A6 | A8 | A10 | A12 | A14 | A16 |
|---|---|---|---|---|---|---|---|
| S3 | −2.9813E−02 | −2.3783E−02 | 1.2681E−02 | 1.0999E−03 | 0.0000E+00 | 0.0000E+00 | 0.0000E+00 |
| S4 | 2.8192E−01 | −1.3376E+00 | 1.3906E+01 | −6.5928E+01 | 1.5725E+02 | −1.5937E+02 | 0.0000E+00 |
| S5 | −4.1340E−01 | −1.7666E−01 | −1.8303E+00 | 4.4028E+00 | 0.0000E+00 | 0.0000E+00 | 0.0000E+00 |
| S6 | −5.6635E−01 | −3.3838E+00 | 6.4554E+01 | −4.1286E+02 | 1.2969E+03 | −1.5835E+03 | 0.0000E+00 |
| S7 | −2.6929E−01 | −1.1033E+00 | 2.4818E+01 | −1.3508E+02 | 2.1760E+02 | 0.0000E+00 | 0.0000E+00 |
| S8 | −1.1096E+00 | 3.1656E+00 | 1.5144E+01 | −1.0749E+02 | 1.7818E+02 | 0.0000E+00 | 0.0000E+00 |
| S9 | −8.2676E−01 | 2.0239E+00 | −2.1207E+01 | 3.1679E+02 | −2.1802E+03 | 6.5669E+03 | −7.0811E+03 |
| S10 | −9.2399E−01 | 9.3303E+00 | −5.9822E+01 | 2.6409E+02 | −7.5836E+02 | 1.2437E+03 | −8.5988E+02 |
| S11 | −1.5207E−01 | 1.6554E+00 | −7.0209E+00 | 1.6550E+01 | −2.2909E+01 | 1.3418E+01 | −9.4786E−01 |
| S12 | −3.0660E−01 | 3.7287E−01 | −1.6677E−01 | −4.7381E−01 | −1.8716E−01 | 2.4297E−01 | 0.0000E+00 |

Figure 4A:
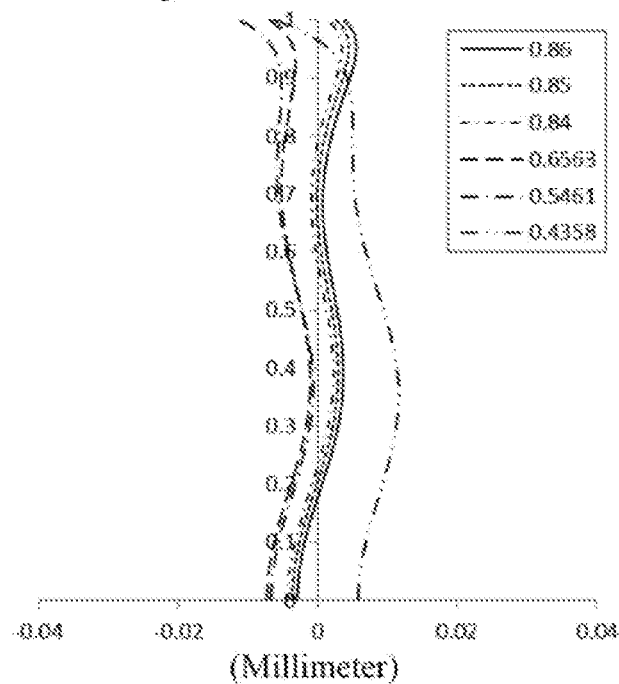
FIGS. 4A to 4D illustrate a longitudinal aberration curve, an astigmatic curve, an f-θ distortion curve, and a relative illumination curve of the optical imaging system of the Example 2, respectively.
Figure 4B:
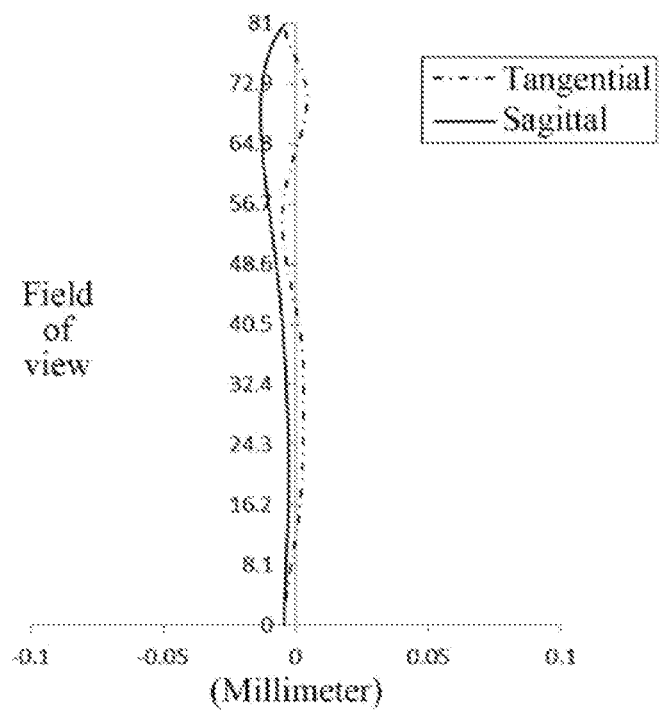
Figure 4C:
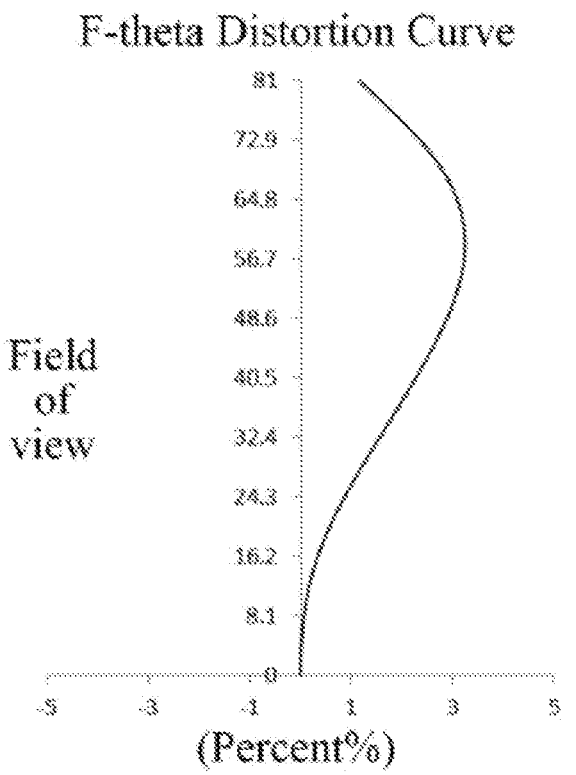
Figure 4D:
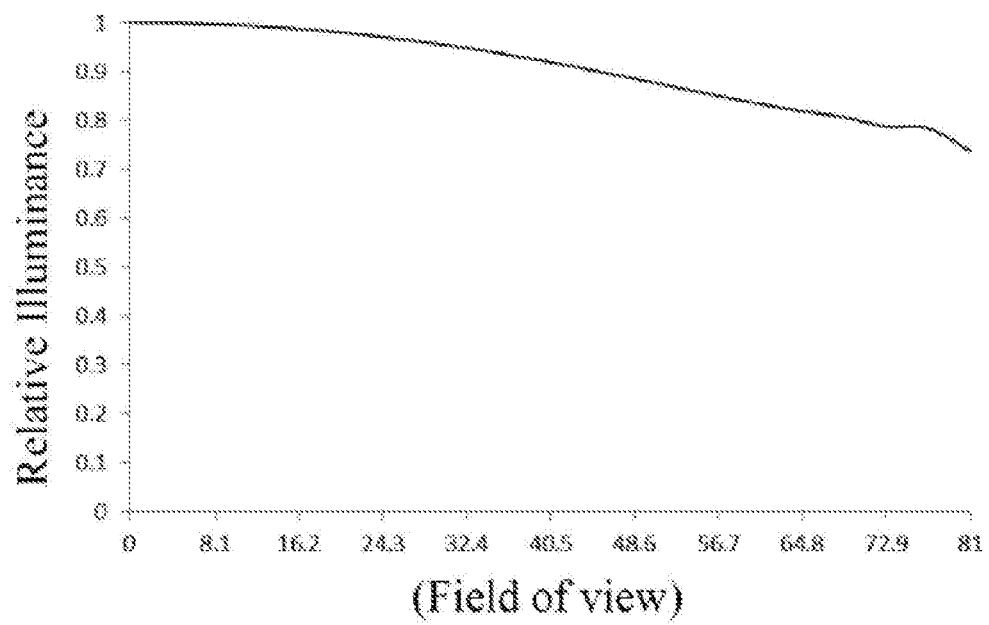

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates an f-θ distortion curve of the optical imaging system according to example 2, representing amounts of distortion corresponding to different field-of-views. FIG. 4D illustrates a relative illumination curve of the optical imaging system according to example 2, representing relative illumination at different field-of-views. It can be seen from FIG. 4A to FIG. 4D that the optical imaging system provided in example 2 may achieve good image quality.

Example 3

Figure 5:
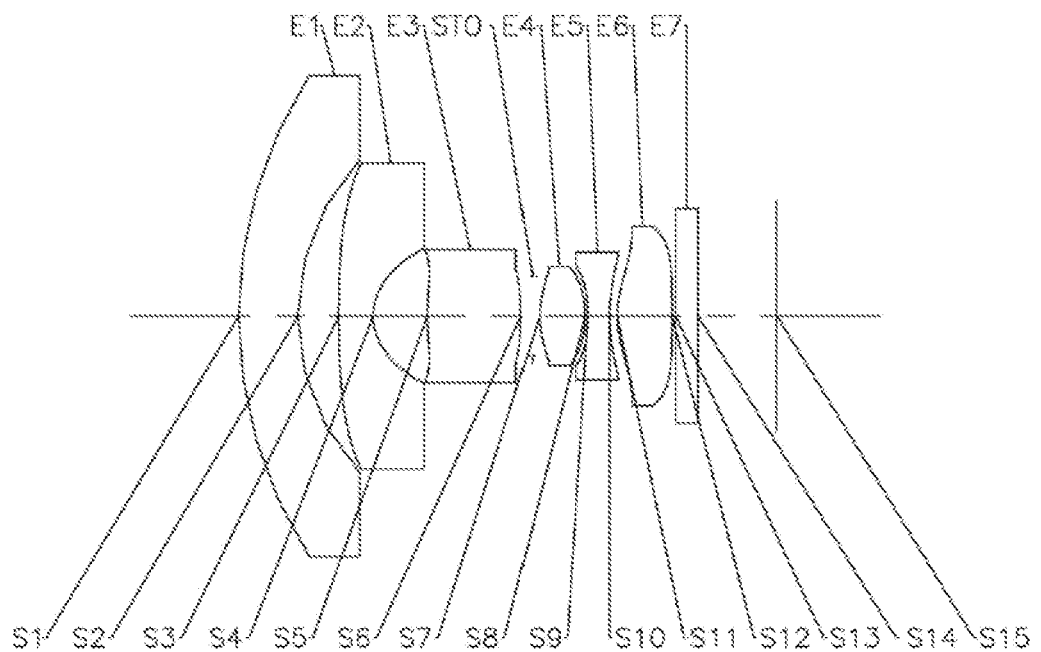
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 3, an effective focal length f of the optical imaging system is 0.74 mm, an on-axis distance TTL from the object-side surface S1 of the first lens E1 to the imaging plane S15 is 5.00 mm, and a maximum field-of-view FOV is 166.0°.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 4.1473 | 0.5500 | 1.74 | 52.3 | −6.53 | 0.0000 |
| S2 | Spherical | 2.1284 | 0.3812 | | | | 0.0000 |
| S3 | Aspheric | 13.1935 | 0.3200 | 1.54 | 56.1 | −0.99 | 0.0000 |
| S4 | Aspheric | 0.5130 | 0.5033 | | | | −0.6190 |
| S5 | Aspheric | 2.3661 | 0.8694 | 1.62 | 23.5 | 2.41 | −0.9922 |
| S6 | Aspheric | −3.8750 | 0.1032 | | | | 19.6893 |
| STO | Spherical | Infinite | 0.0673 | | | | |
| S7 | Aspheric | 0.8995 | 0.4201 | 1.54 | 56.1 | 0.96 | −3.2375 |
| S8 | Aspheric | −1.0586 | 0.0250 | | | | 1.9259 |
| S9 | Aspheric | −1.7460 | 0.2000 | 1.65 | 19.2 | −1.05 | 5.3760 |
| S10 | Aspheric | 1.2652 | 0.0734 | | | | −7.4945 |
| S11 | Aspheric | 0.7981 | 0.5112 | 1.54 | 56.1 | 1.45 | −8.0024 |
| S12 | Aspheric | −60.0000 | 0.0327 | | | | 99.0000 |
| S13 | Spherical | Infinite | 0.2100 | 1.52 | 64.2 | | |
| S14 | Spherical | Infinite | 0.7294 | | | | |
| S15 | Spherical | Infinite | | | | | |

TABLE 6

| Surface number | A4 | A6 | A8 | A10 | A12 | A14 | A16 |
|---|---|---|---|---|---|---|---|
| S3 | 3.8587E−02 | −3.1257E−03 | −3.5309E−03 | 1.7511E−03 | 0.0000E+00 | 0.0000E+00 | 0.0000E+00 |
| S4 | 9.1901E−02 | −1.6137E+00 | 1.4303E+01 | −6.2131E+01 | 1.4535E+02 | −1.4206E+02 | 0.0000E+00 |
| S5 | −5.3766E−01 | −2.8874E−01 | −2.4445E+00 | 5.4422E+00 | 0.0000E+00 | 0.0000E+00 | 0.0000E+00 |
| S6 | −8.7653E−01 | −1.6036E+00 | 5.3539E+01 | −3.5449E+02 | 1.1510E+03 | −1.4381E+03 | 0.0000E+00 |
| S7 | −3.1283E−01 | −2.4982E+00 | 5.0159E+01 | −2.7232E+02 | 5.0854E+02 | 0.0000E+00 | 0.0000E+00 |
| S8 | −3.3844E−01 | −1.4305E+01 | 1.5819E+02 | −6.5164E+02 | 9.8455E+02 | 0.0000E+00 | 0.0000E+00 |
| S9 | −1.9213E−01 | −1.6752E+01 | 1.3751E+02 | −3.0712E+02 | −1.3939E+03 | 7.7437E+03 | −9.8990E+03 |
| S10 | −8.3202E−01 | 5.3429E+00 | −2.0663E+01 | 6.0084E+01 | −1.4900E+02 | 2.5432E+02 | −1.8773E+02 |
| S11 | −4.2102E−01 | 2.7643E+00 | −1.3560E+01 | 4.2554E+01 | −8.6808E+01 | 9.8202E+01 | −4.5055E+01 |
| S12 | −2.3040E−01 | 1.0314E−02 | −8.1335E−02 | −2.5913E−01 | −1.8716E−01 | 2.4297E−01 | 0.0000E+00 |

Figure 6A:
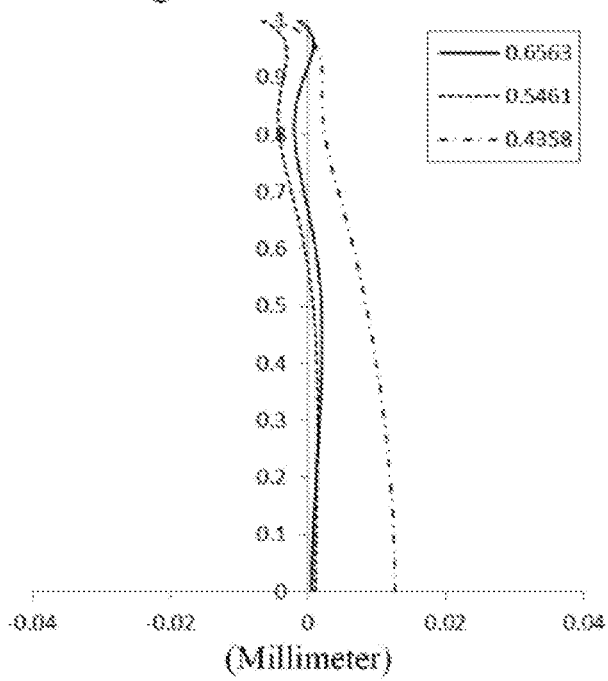
FIGS. 6A to 6D illustrate a longitudinal aberration curve, an astigmatic curve, an f-θ distortion curve, and a relative illumination curve of the optical imaging system of the Example 3, respectively.
Figure 6B:
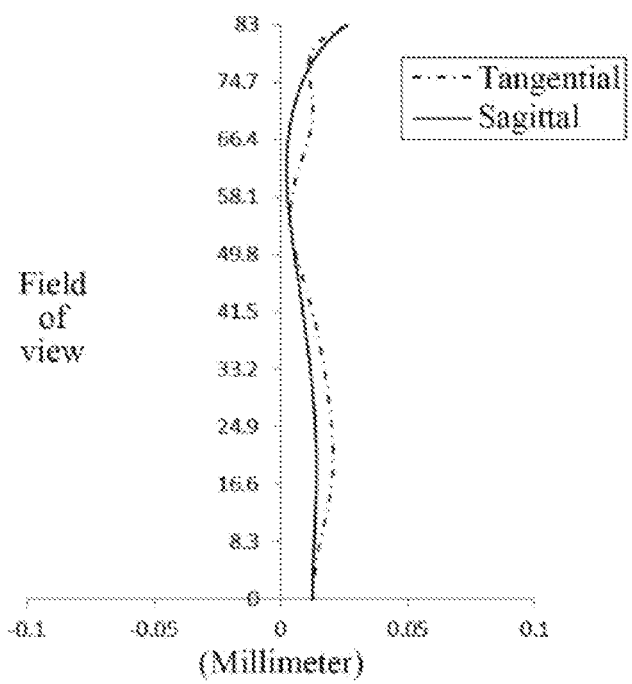
Figure 6C:
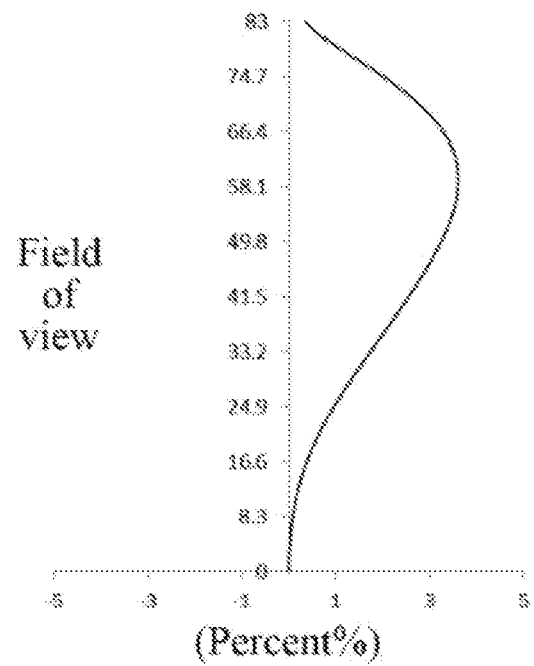
Figure 6D:
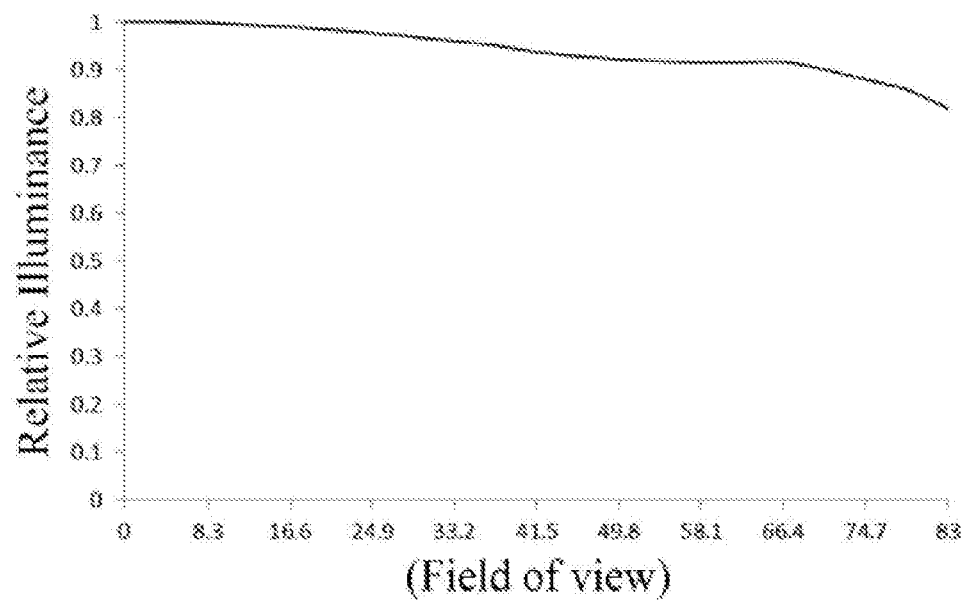

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates an f-θ distortion curve of the optical imaging system according to example 3, representing amounts of distortion corresponding to different field-of-views. FIG. 6D illustrates a relative illumination curve of the optical imaging system according to example 3, representing relative illumination corresponding to different field-of-views. It can be seen from FIG. 6A to FIG. 6D that the optical imaging system provided in example 3 may achieve good image quality.

Example 4

Figure 7:
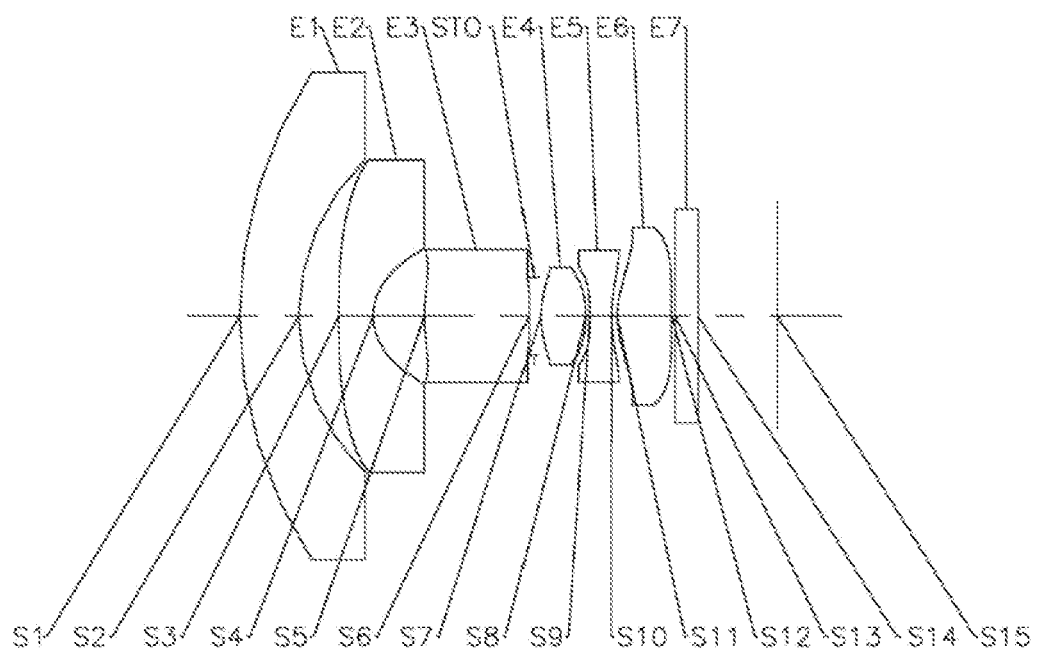
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 4, an effective focal length f of the optical imaging system is 0.74 mm, an on-axis distance TTL from the object-side surface S1 of the first lens E1 to the imaging plane S15 is 5.00 mm, and a maximum field-of-view FOV is 166.0°.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

curvature of a tangential plane and a curvature of a sagittal plane. FIG. 8C illustrates an f-θ distortion curve of the optical imaging system according to example 4, representing amounts of distortion corresponding to different field-of-views. FIG. 8D illustrates a relative illumination curve of the optical imaging system according to example 4, representing relative illumination corresponding to different field-of-views. It can be seen from FIG. 8A to FIG. 8D that the optical imaging system provided in example 4 may achieve good image quality.

Example 5

Figure 9:
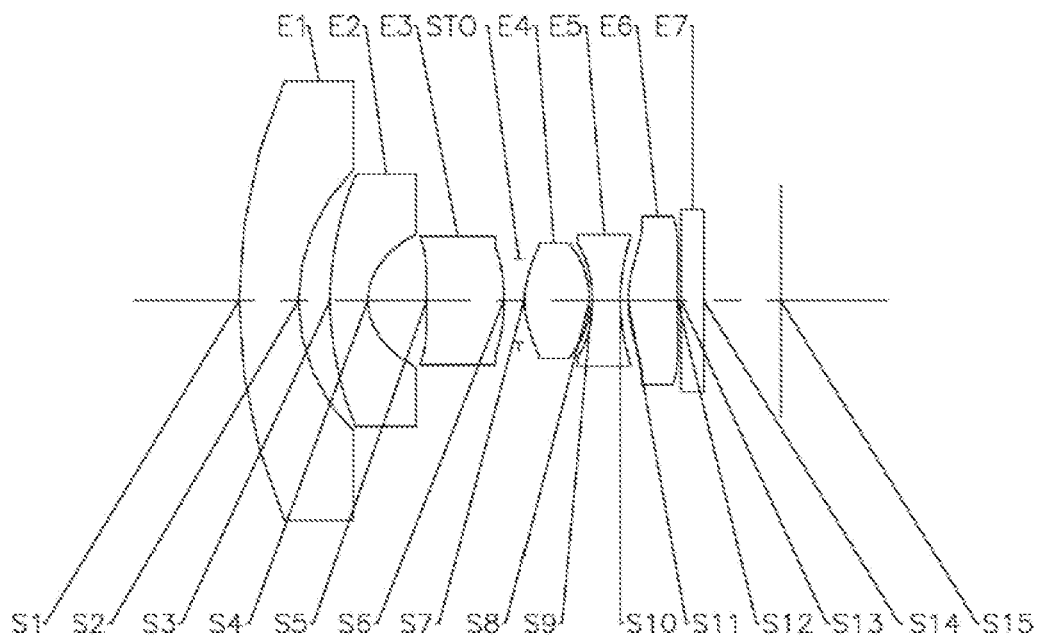
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 4.2007 | 0.5500 | 1.74 | 52.3 | −5.89 | 0.0000 |
| S2 | Spherical | 2.0432 | 0.3722 | | | | 0.0000 |
| S3 | Aspheric | 12.9619 | 0.3200 | 1.54 | 56.1 | −0.99 | 0.0000 |
| S4 | Aspheric | 0.5130 | 0.4770 | | | | −0.6501 |
| S5 | Aspheric | 1.8065 | 0.9670 | 1.62 | 23.5 | 2.85 | 0.2715 |
| S6 | Aspheric | 80.0000 | 0.0453 | | | | 99.0000 |
| STO | Spherical | Infinite | 0.0646 | | | | |
| S7 | Aspheric | 0.8733 | 0.4163 | 1.54 | 56.1 | 0.94 | −3.9206 |
| S8 | Aspheric | −1.0381 | 0.0378 | | | | 1.9002 |
| S9 | Aspheric | −2.8332 | 0.2000 | 1.65 | 19.2 | −1.14 | 21.5571 |
| S10 | Aspheric | 1.0967 | 0.0550 | | | | −11.4747 |
| S11 | Aspheric | 0.7608 | 0.5073 | 1.54 | 56.1 | 1.38 | −7.5136 |
| S12 | Aspheric | −80.0000 | 0.0327 | | | | 99.0000 |
| S13 | Spherical | Infinite | 0.2100 | 1.52 | 64.2 | | |
| S14 | Spherical | Infinite | 0.7409 | | | | |
| S15 | Spherical | Infinite | | | | | |

TABLE 8

| Surface number | A4 | A6 | A8 | A10 | A12 | A14 | A16 |
|---|---|---|---|---|---|---|---|
| S3 | 6.3783E−02 | −1.9700E−02 | 8.9856E−04 | 1.7603E−03 | 0.0000E+00 | 0.0000E+00 | 0.0000E+00 |
| S4 | 9.0404E−02 | −1.0554E+00 | 1.0187E+01 | −4.0308E+01 | 8.6659E+01 | −8.3481E+01 | 0.0000E+00 |
| S5 | −5.1877E−01 | −5.7249E−02 | −3.2297E+00 | 5.6705E+00 | 0.0000E+00 | 0.0000E+00 | 0.0000E+00 |
| S6 | −1.1784E+00 | −5.4388E+00 | 1.7384E+02 | −1.5557E+03 | 6.7110E+03 | −1.0857E+04 | 0.0000E+00 |
| S7 | −4.8428E−01 | −1.8452E+00 | 5.0689E+01 | −2.8261E+02 | 5.7099E+02 | 0.0000E+00 | 0.0000E+00 |
| S8 | 4.5894E−01 | −2.8160E+01 | 2.5141E+02 | −9.5644E+02 | 1.4160E+03 | 0.0000E+00 | 0.0000E+00 |
| S9 | 4.1115E−01 | −3.6135E+01 | 2.8992E+02 | −1.0014E+03 | 7.6911E+02 | 3.3360E+03 | −5.9569E+03 |
| S10 | −3.1596E−01 | −4.7196E+00 | 5.2634E+01 | −2.3903E+02 | 5.6556E+02 | −6.9377E+02 | 3.5257E+02 |
| S11 | −4.5703E−01 | 2.3797E+00 | −8.7151E+00 | 2.1831E+01 | −3.9453E+01 | 4.0158E+01 | −1.6021E+01 |
| S12 | −2.6277E−01 | 9.4512E−02 | −8.9274E−02 | −2.8862E−01 | −1.8716E−01 | 2.4297E−01 | 0.0000E+00 |

Figure 8A:
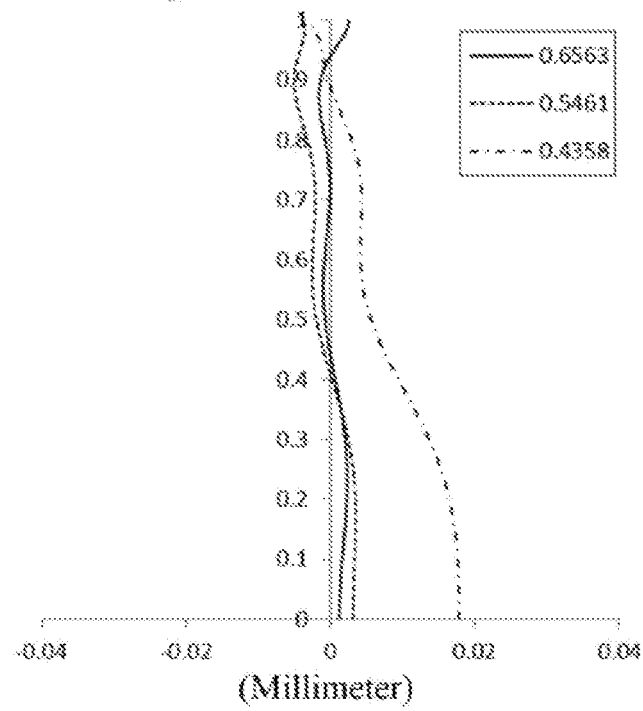
FIGS. 8A to 8D illustrate a longitudinal aberration curve, an astigmatic curve, an f-θ distortion curve, and a relative illumination curve of the optical imaging system of the Example 4, respectively.
Figure 8B:
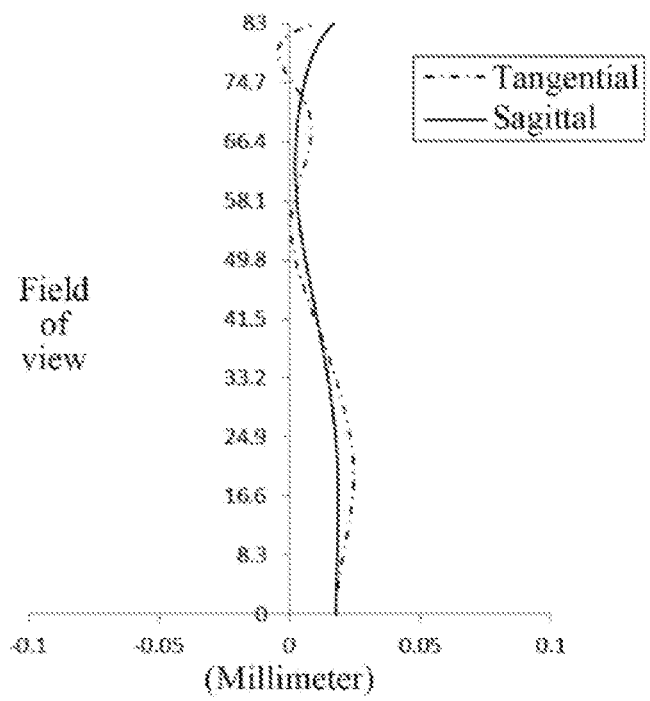
Figure 8C:
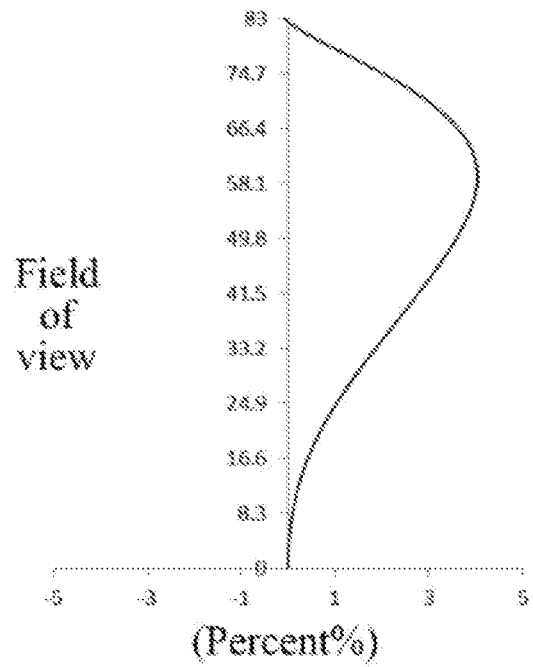
Figure 8D:
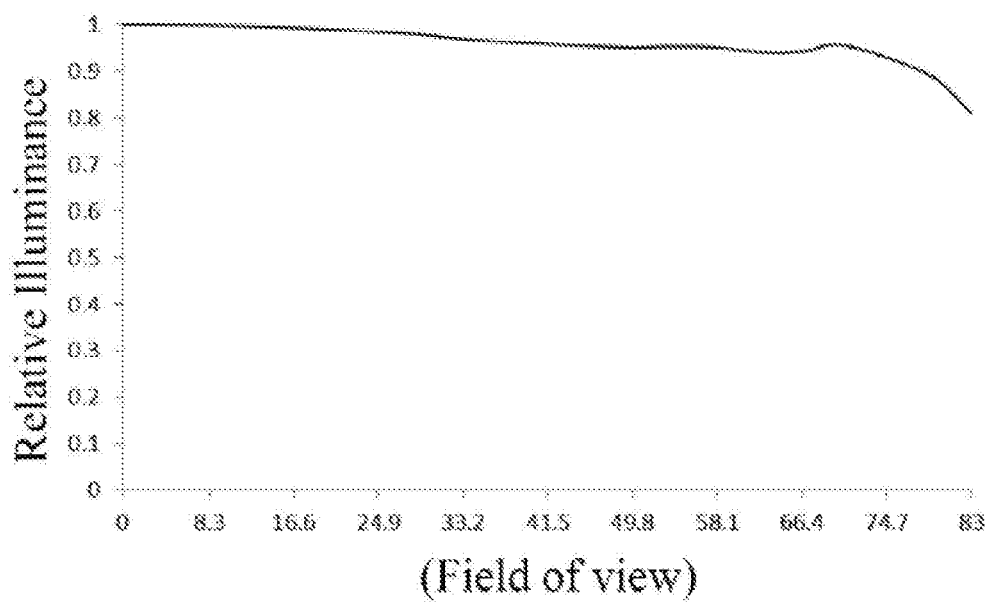

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 5, an effective focal length f of the optical imaging system is 0.74 mm, an on-axis distance TTL from the object-side surface S1 of the first lens E1 to the imaging plane S15 is 5.00 mm, and a maximum field-of-view FOV is 163.4°.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

Figure 10A:
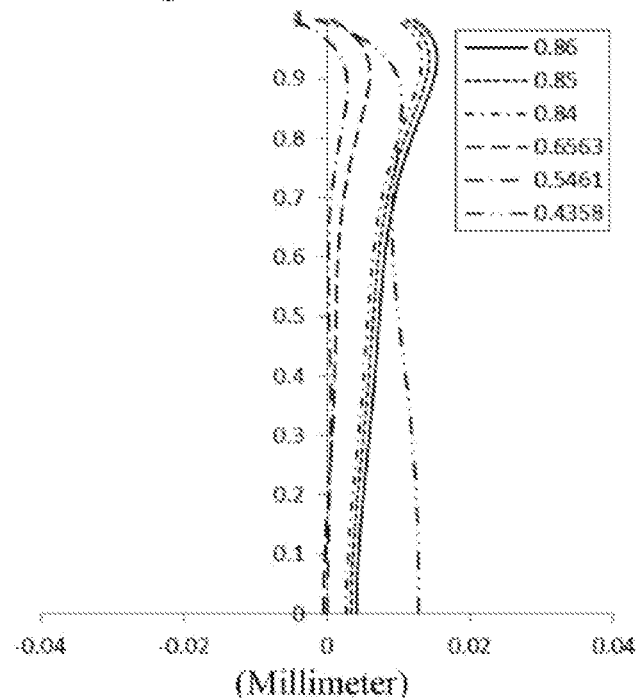
FIGS. 10A to 10D illustrate a longitudinal aberration curve, an astigmatic curve, an f-θ distortion curve, and a relative illumination curve of the optical imaging system of the Example 5, respectively.
Figure 10B:
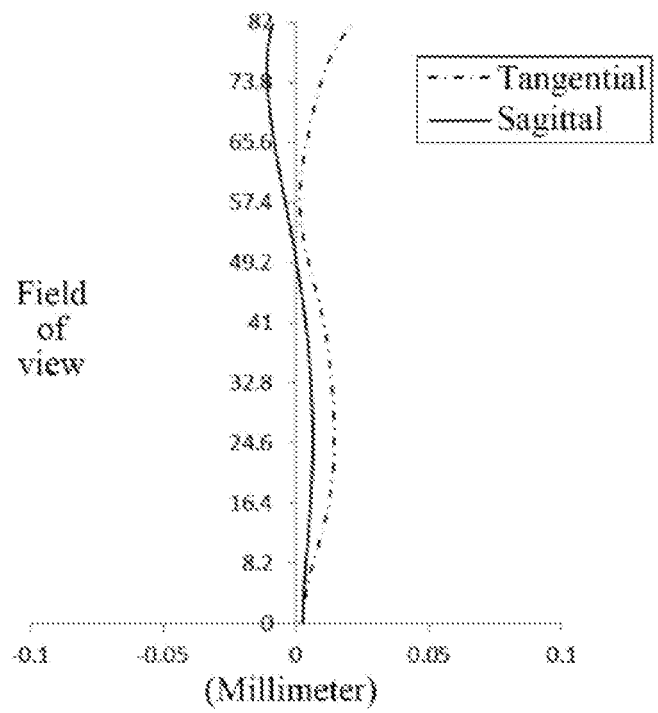
Figure 10C:
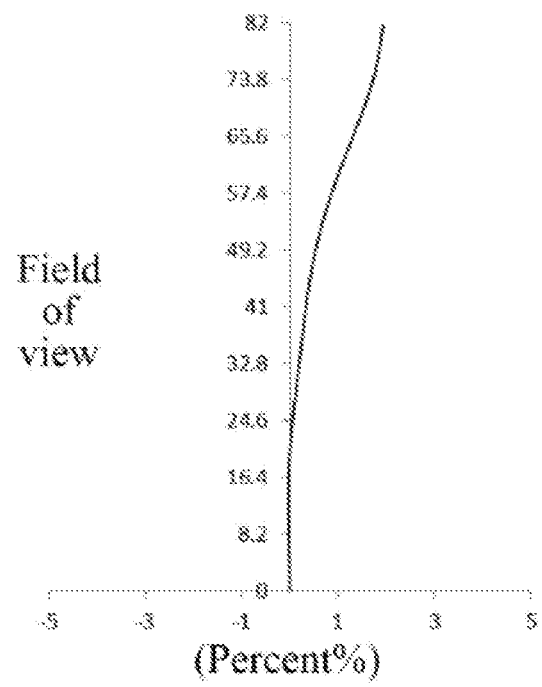
Figure 10D:
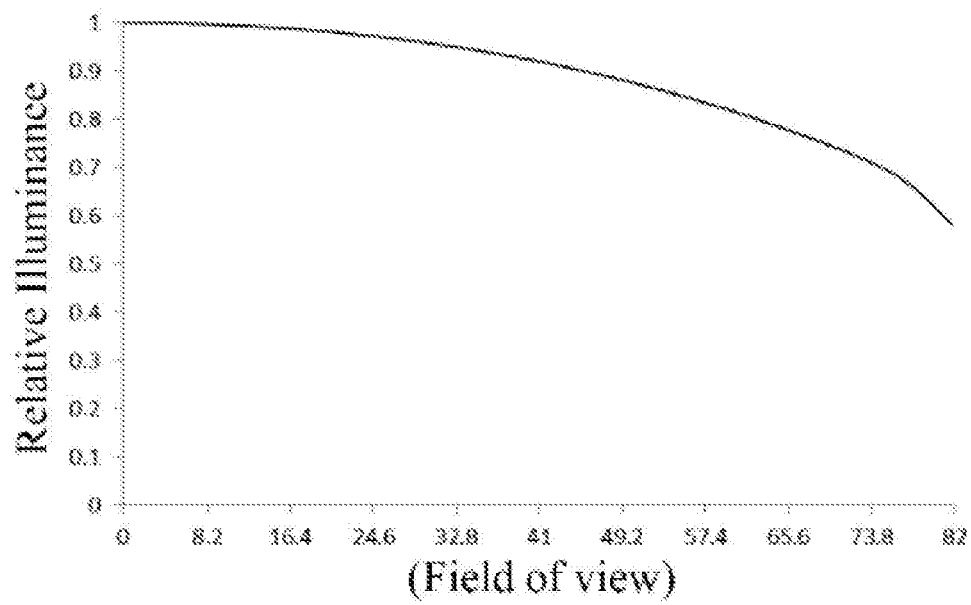

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates an f-θ distortion curve of the optical imaging system according to example 5, representing amounts of distortion corresponding to different field-of-views. FIG. 10D illustrates a relative illumination curve of the optical imaging system according to example 5, representing relative illumination corresponding to different field-of-views. It can be seen from FIG. 10A to FIG. 10D that the optical imaging system provided in example 5 may achieve good image quality.

Example 6

Figure 11:
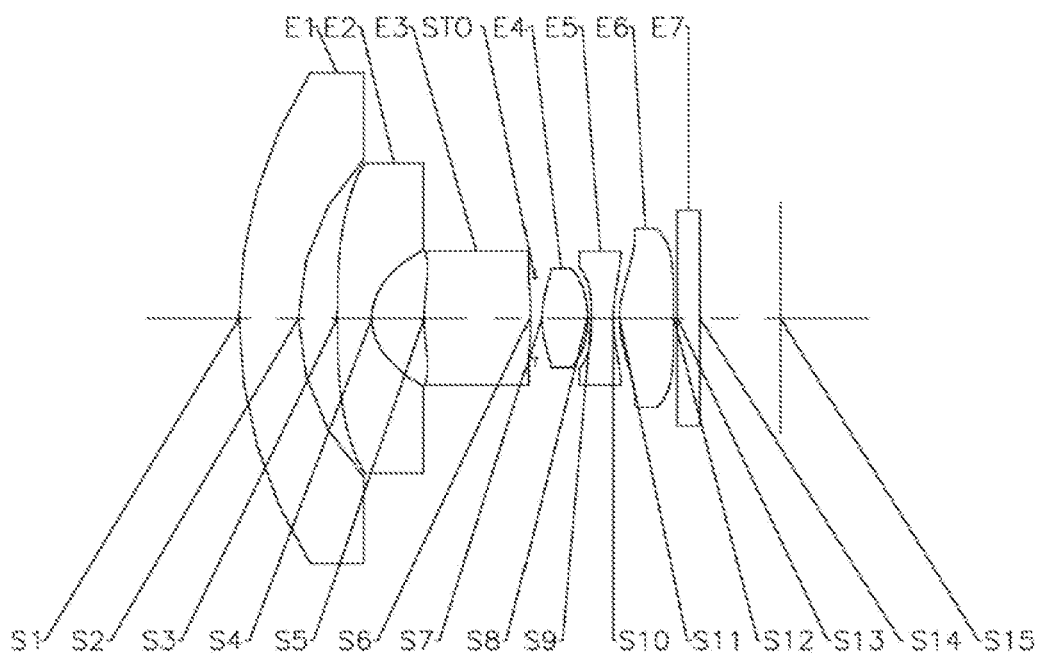
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a first lens E1, a second lens E2, a third lens E3, a stop STO, a fourth lens E4, a fifth lens E5, a sixth lens E6 and an optical

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 5.1501 | 0.5501 | 1.74 | 52.3 | −3.59 | 0.0000 |
| S2 | Spherical | 1.7004 | 0.2920 | | | | 0.0000 |
| S3 | Aspheric | 2.3571 | 0.3507 | 1.54 | 56.1 | −1.31 | 0.0000 |
| S4 | Aspheric | 0.5200 | 0.5450 | | | | −0.6031 |
| S5 | Aspheric | 28.5023 | 0.7156 | 1.62 | 23.5 | 3.78 | 0.0000 |
| S6 | Aspheric | −2.6460 | 0.1378 | | | | 5.1049 |
| STO | Spherical | Infinite | 0.0483 | | | | |
| S7 | Aspheric | 0.8295 | 0.5994 | 1.54 | 56.1 | 0.92 | −2.4920 |
| S8 | Aspheric | −0.9444 | 0.0255 | | | | 1.1344 |
| S9 | Aspheric | −1.4345 | 0.2600 | 1.65 | 19.2 | −1.11 | −0.6976 |
| S10 | Aspheric | 1.7149 | 0.0723 | | | | −0.2844 |
| S11 | Aspheric | 0.8865 | 0.4582 | 1.54 | 56.1 | 1.86 | −8.1594 |
| S12 | Aspheric | 5.5628 | 0.0328 | | | | −99.0000 |
| S13 | Spherical | Infinite | 0.2101 | 1.52 | 64.2 | | |
| S14 | Spherical | Infinite | 0.7146 | | | | |
| S15 | Spherical | Infinite | | | | | |

TABLE 10

| Surface number | A4 | A6 | A8 | A10 | A12 | A14 | A16 |
|---|---|---|---|---|---|---|---|
| S3 | −1.4543E−01 | 1.6503E−01 | −8.6791E−02 | 1.7865E−02 | 0.0000E+00 | 0.0000E+00 | 0.0000E+00 |
| S4 | −1.0338E−02 | −1.8031E+00 | 1.8847E+01 | −9.1862E+01 | 2.4905E+02 | −2.6804E+02 | 0.0000E+00 |
| S5 | −5.6689E−01 | 1.3548E−02 | −7.8068E−01 | 2.4917E+00 | 0.0000E+00 | 0.0000E+00 | 0.0000E+00 |
| S6 | −1.0136E+00 | 4.0976E+00 | −1.6359E+01 | 7.0726E+01 | −1.8674E+02 | 2.1197E+02 | 0.0000E+00 |
| S7 | −4.7974E−01 | 3.0942E+00 | −8.7963E+00 | 8.1916E+00 | 9.6497E+00 | 0.0000E+00 | 0.0000E+00 |
| S8 | −3.5535E−01 | −2.8952E+00 | 4.2181E+01 | −1.5225E+02 | 2.0351E+02 | 0.0000E+00 | 0.0000E+00 |
| S9 | −6.6132E−02 | −6.9785E+00 | 2.6452E+01 | 1.4399E+02 | −1.5091E+03 | 4.4626E+03 | −4.4524E+03 |
| S10 | −1.3659E−01 | −1.3524E−01 | 2.3406E+00 | 3.1395E+00 | −5.9417E+01 | 1.5429E+02 | −1.2305E+02 |
| S11 | −9.8020E−02 | −1.9932E−01 | 2.4857E+00 | −1.1025E+01 | 2.4806E+01 | −3.3962E+01 | 2.1003E+01 |
| S12 | −3.1080E−01 | 3.1800E−01 | −1.4807E−01 | −2.3184E−01 | −1.8290E−01 | 2.3643E−01 | 0.0000E+00 | filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 6, an effective focal length f of the optical imaging system is 0.74 mm, an on-axis distance TTL from the object-side surface S1 of the first lens E1 to the imaging plane S15 is 5.00 mm, and a maximum field-of-view FOV is 167.0°.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 4.2825 | 0.5500 | 1.74 | 52.3 | −6.13 | 0.0000 |
| S2 | Spherical | 2.1052 | 0.3585 | | | | 0.0000 |
| S3 | Aspheric | 13.6472 | 0.3200 | 1.54 | 56.1 | −0.98 | 0.0000 |
| S4 | Aspheric | 0.5130 | 0.4835 | | | | −0.6441 |
| S5 | Aspheric | 1.8410 | 0.9727 | 1.62 | 23.5 | 2.90 | 0.4845 |
| S6 | Aspheric | 80.0000 | 0.0434 | | | | 0.0000 |
| STO | Spherical | Infinite | 0.0660 | | | | |
| S7 | Aspheric | 0.8725 | 0.4201 | 1.54 | 56.1 | 0.94 | −3.9297 |
| S8 | Aspheric | −1.0383 | 0.0374 | | | | 1.9066 |
| S9 | Aspheric | −2.8958 | 0.2000 | 1.65 | 19.2 | −1.15 | 21.9569 |
| S10 | Aspheric | 1.0958 | 0.0567 | | | | −11.4885 |
| S11 | Aspheric | 0.7594 | 0.5035 | 1.54 | 56.1 | 1.39 | −7.4117 |
| S12 | Aspheric | 251.8331 | 0.0327 | | | | −99.0004 |
| S13 | Spherical | Infinite | 0.2100 | 1.52 | 64.2 | | |
| S14 | Spherical | Infinite | 0.7418 | | | | |
| S15 | Spherical | Infinite | | | | | |

TABLE 12

| Surface number | A4 | A6 | A8 | A10 | A12 | A14 | A16 |
|---|---|---|---|---|---|---|---|
| S3 | 6.5175E−02 | −2.1791E−02 | 2.0830E−03 | 1.4080E−03 | 0.0000E+00 | 0.0000E+00 | 0.0000E+00 |
| S4 | 8.8049E−02 | −1.1764E+00 | 1.1414E+01 | −4.6224E+01 | 1.0025E+02 | −9.5516E+01 | 0.0000E+00 |
| S5 | −5.2299E−01 | −8.8711E−03 | −3.2442E+00 | 5.5642E+00 | 0.0000E+00 | 0.0000E+00 | 0.0000E+00 |
| S6 | −1.1713E+00 | −5.2843E+00 | 1.6942E+02 | −1.5067E+03 | 6.4613E+03 | −1.0391E+04 | 0.0000E+00 |
| S7 | −4.8468E−01 | −1.6977E+00 | 4.8021E+01 | −2.6618E+02 | 5.3304E+02 | 0.0000E+00 | 0.0000E+00 |
| S8 | 4.5685E−01 | −2.7972E+01 | 2.4833E+02 | −9.3774E+02 | 1.3762E+03 | 0.0000E+00 | 0.0000E+00 |
| S9 | 3.6970E−01 | −3.4978E+01 | 2.7075E+02 | −8.2724E+02 | −1.0984E+02 | 5.6623E+03 | −8.4620E+03 |
| S10 | −3.1873E−01 | −4.7036E+00 | 5.2331E+01 | −2.3668E+02 | 5.5718E+02 | −6.8012E+02 | 3.4430E+02 |
| S11 | −4.5731E−01 | 2.3405E+00 | −8.4265E+00 | 2.0700E+01 | −3.6700E+01 | 3.6379E+01 | −1.3925E+01 |
| S12 | −2.6512E−01 | 9.5739E−02 | −8.6993E−02 | −2.8500E−01 | −1.8716E−01 | 2.4297E−01 | 0.0000E+00 |

Figure 12A:
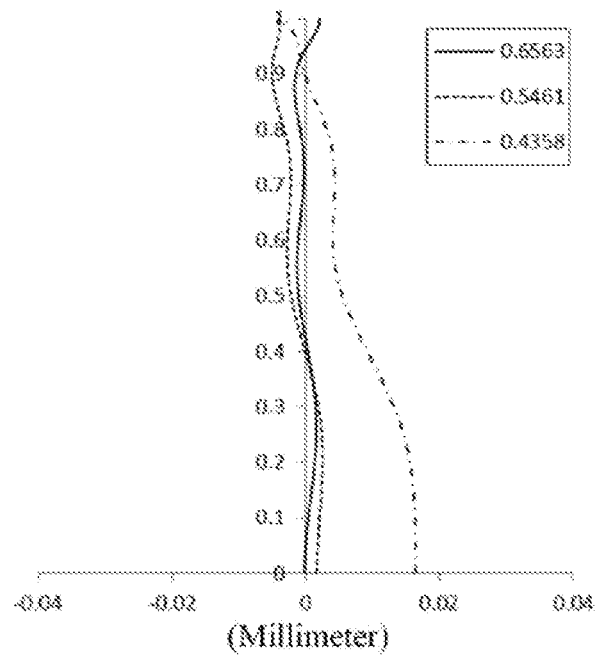
FIGS. 12A to 12D illustrate a longitudinal aberration curve, an astigmatic curve, an f-θ distortion curve, and a relative illumination curve of the optical imaging system of the Example 6, respectively.
Figure 12B:
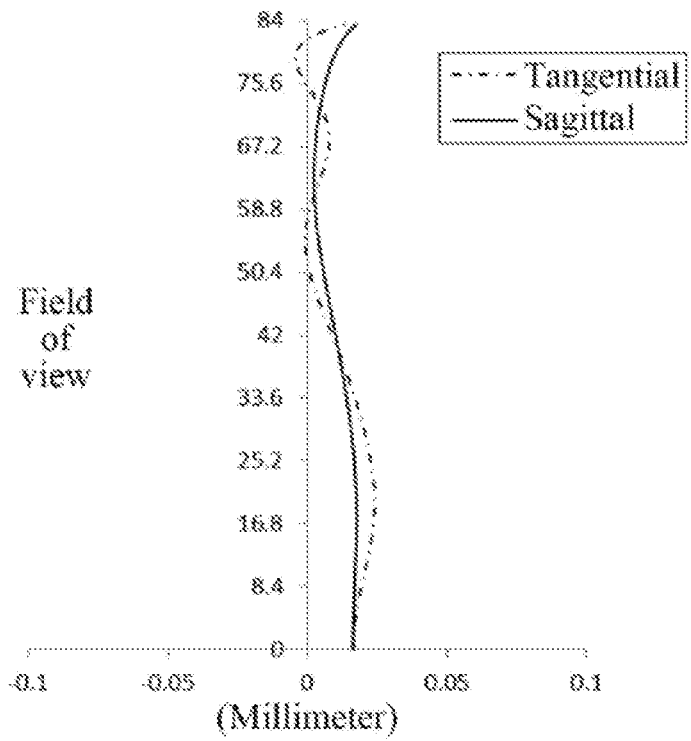
Figure 12C:
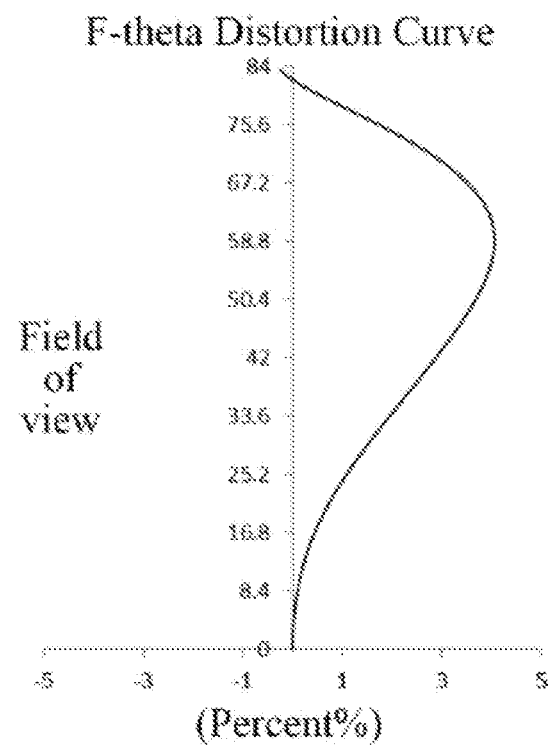
Figure 12D:
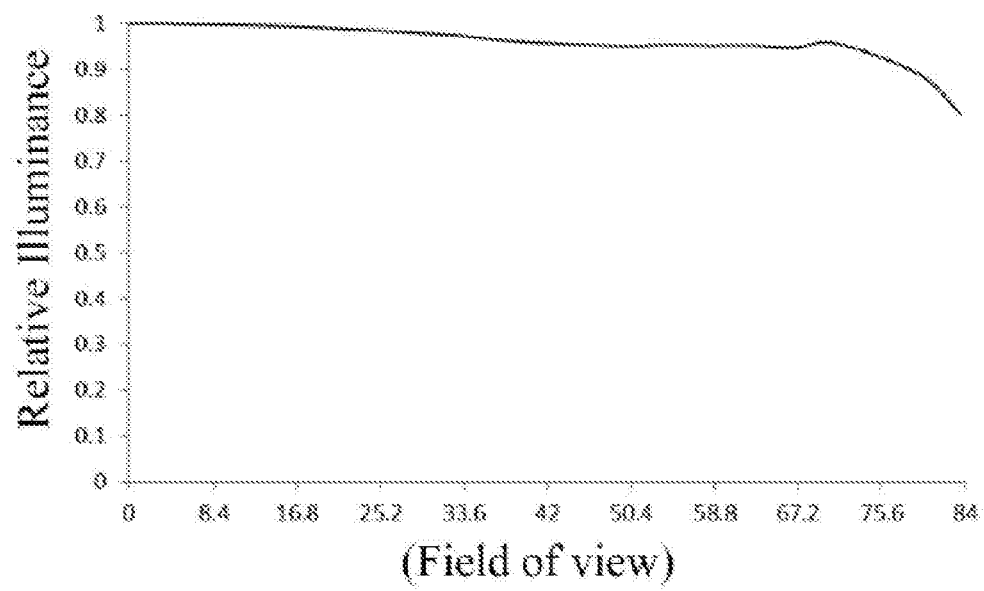

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates an f-θ distortion curve of the optical imaging system according to example 6, representing amounts of distortion corresponding to different field-of-views. FIG. 12D illustrates a relative illumination curve of the optical imaging system according to example 6, representing relative illumination corresponding to different field-of-views. It can be seen from FIG. 12A to FIG. 12D that the optical imaging system provided in example 6 may achieve good image quality.

Example 7

Figure 13:
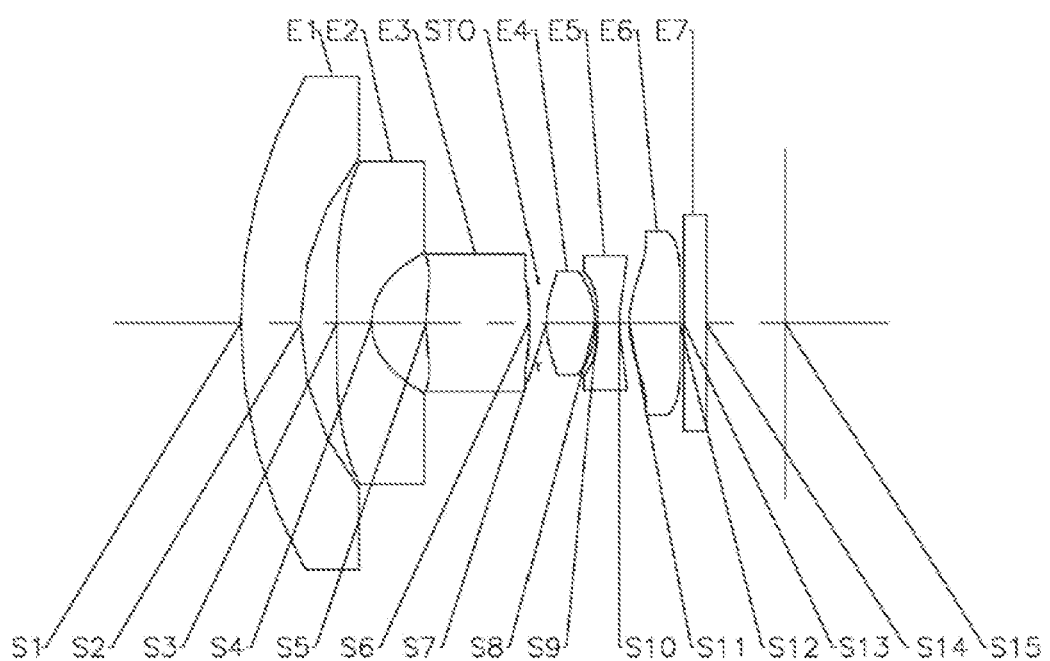
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 7, an effective focal length f of the optical imaging system is 0.74 mm, an on-axis distance TTL from the object-side surface S1 of the first lens E1 to the imaging plane S15 is 5.00 mm, and a maximum field-of-view FOV is 166.4°.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 4.6587 | 0.5500 | 1.74 | 52.3 | −7.56 | 0.0000 |
| S2 | Spherical | 2.4399 | 0.3338 | | | | 0.0000 |
| S3 | Aspheric | −60.0000 | 0.3200 | 1.54 | 56.1 | −0.98 | 0.0000 |
| S4 | Aspheric | 0.5391 | 0.5036 | | | | −0.6370 |
| S5 | Aspheric | 2.1259 | 0.9397 | 1.62 | 23.5 | 2.56 | 1.3208 |
| S6 | Aspheric | −6.2035 | 0.0794 | | | | −99.0000 |
| STO | Spherical | Infinite | 0.0768 | | | | |
| S7 | Aspheric | 0.9316 | 0.4457 | 1.54 | 56.1 | 0.98 | −2.6730 |
| S8 | Aspheric | −1.0385 | 0.0250 | | | | 1.9059 |
| S9 | Aspheric | −2.9152 | 0.2000 | 1.65 | 19.2 | −1.16 | 29.7997 |
| S10 | Aspheric | 1.1064 | 0.0890 | | | | −15.0841 |
| S11 | Aspheric | 0.7829 | 0.4663 | 1.54 | 56.1 | 1.52 | −6.6205 |
| S12 | Aspheric | 10.8052 | 0.0329 | | | | 85.2558 |
| S13 | Spherical | Infinite | 0.2100 | 1.52 | 64.2 | | |
| S14 | Spherical | Infinite | 0.7249 | | | | |
| S15 | Spherical | Infinite | | | | | |

TABLE 14

| Surface number | A4 | A6 | A8 | A10 | A12 | A14 | A16 |
|---|---|---|---|---|---|---|---|
| S3 | 9.4005E−02 | −4.1400E−02 | 9.9056E−03 | −3.2948E−04 | 0.0000E+00 | 0.0000E+00 | 0.0000E+00 |
| S4 | 5.2086E−02 | −4.6798E−01 | 6.4141E+00 | −2.3507E+01 | 4.8860E+01 | −4.8933E+01 | 0.0000E+00 |
| S5 | −5.5030E−01 | 6.4517E−02 | −2.8035E+00 | 4.7626E+00 | 0.0000E+00 | 0.0000E+00 | 0.0000E+00 |
| S6 | −7.8918E−01 | −4.1079E+00 | 8.7605E+01 | −6.0753E+02 | 2.1139E+03 | −2.8545E+03 | 0.0000E+00 |
| S7 | −2.7176E−01 | −2.2711E+00 | 4.2778E+01 | −2.1549E+02 | 3.6995E+02 | 0.0000E+00 | 0.0000E+00 |
| S8 | −7.0420E−01 | −7.6138E+00 | 1.0506E+02 | −4.4648E+02 | 6.7225E+02 | 0.0000E+00 | 0.0000E+00 |
| S9 | −1.4574E+00 | −6.7221E+00 | 7.8527E+01 | −2.0997E+02 | −4.3174E+02 | 2.0835E+03 | −5.5000E+02 |

TABLE 14-continued

| Surface number | A4 | A6 | A8 | A10 | A12 | A14 | A16 |
|---|---|---|---|---|---|---|---|
| S10 | −7.0488E−01 | 2.5966E+00 | −3.1249E+00 | −8.5308E+00 | 1.4710E+01 | 2.5066E+01 | −4.3468E+01 |
| S11 | −4.2342E−01 | 2.8056E+00 | −1.1524E+01 | 2.8802E+01 | −4.4591E+01 | 3.5187E+01 | −9.9814E+00 |
| S12 | −2.0922E−01 | 1.0230E−01 | −9.0730E−02 | −2.9367E−01 | −1.8716E−01 | 2.4297E−01 | 0.0000E+00 |

Figure 14A:
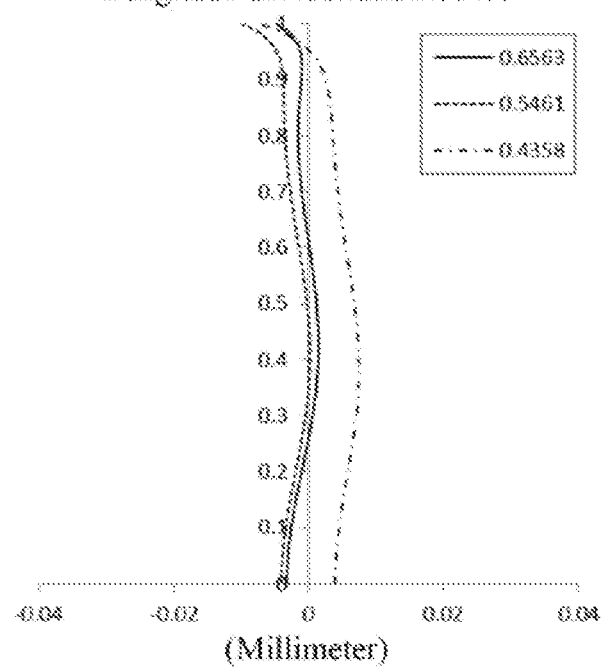
FIGS. 14A to 14D illustrate a longitudinal aberration curve, an astigmatic curve, an f-θ distortion curve, and a relative illumination curve of the optical imaging system of the Example 7, respectively.
Figure 14B:
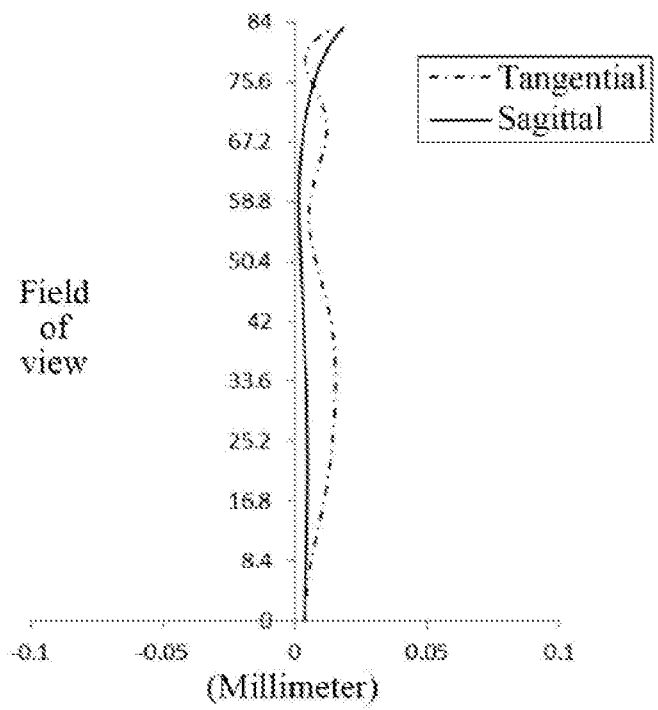
Figure 14C:
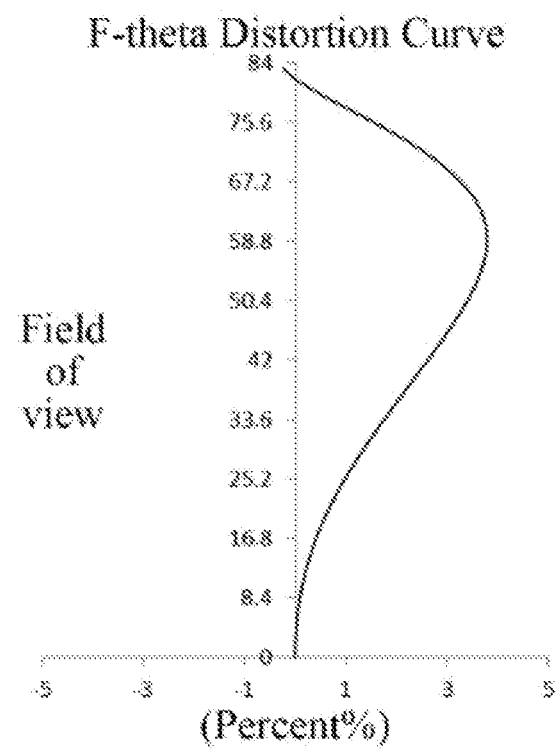
Figure 14D:
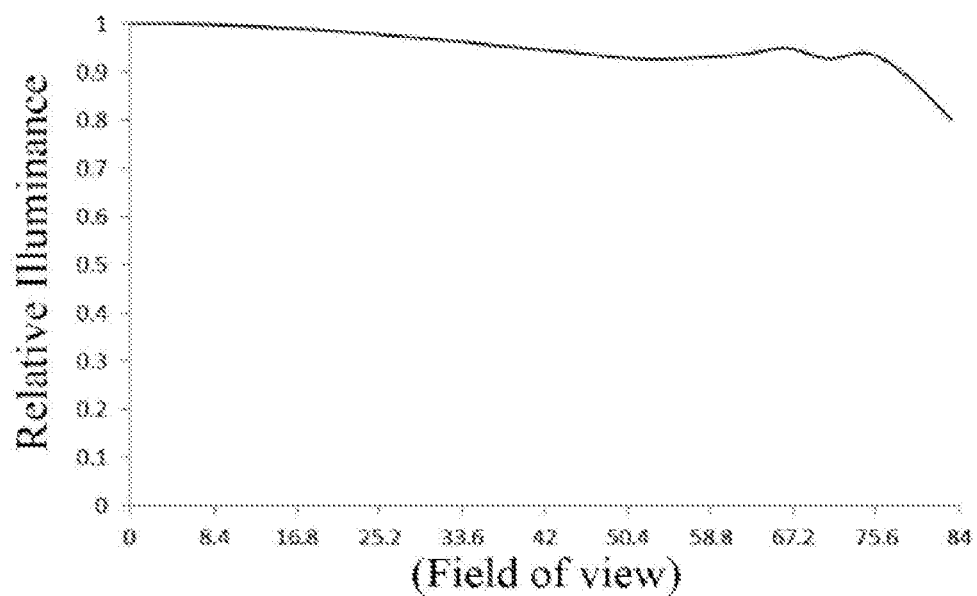

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates an f-θ distortion curve of the optical imaging system according to example 7, representing amounts of distortion corresponding to different field-of-views. FIG. 14D illustrates a relative illumination curve of the optical imaging system according to example 7, representing relative illumination corresponding to different field-of-views. It can be seen from FIG. 14A to FIG. 14D that the optical imaging system provided in example 7 may achieve good image quality.

Example 8

Figure 15:
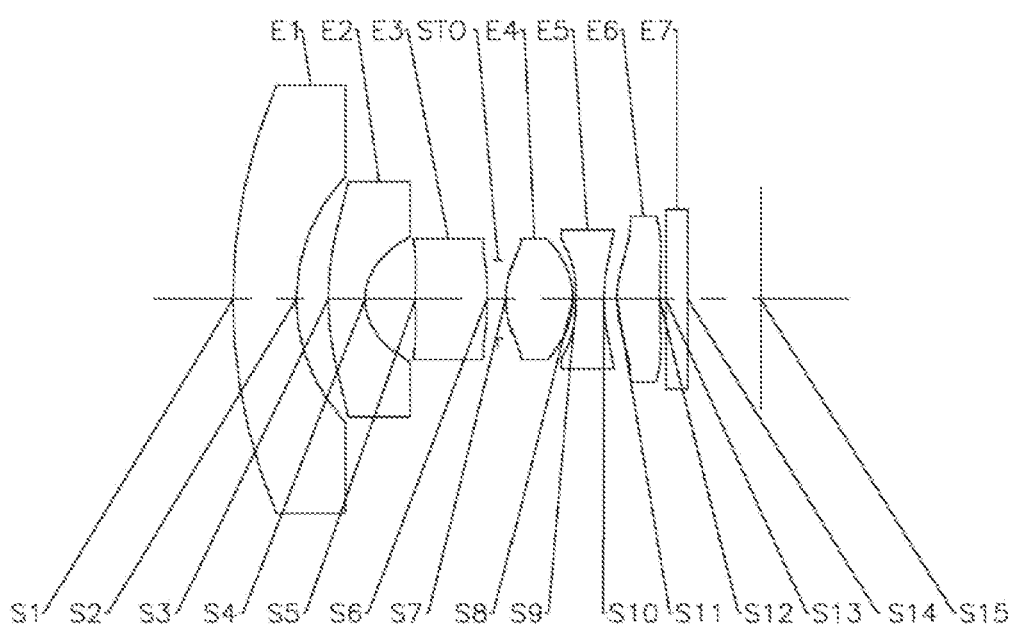
FIG. 15 illustrates a schematic structural view of an optical imaging system according to Example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a first lens E1, a second lens E2, a third lens E3, a stop STO, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The optical filter E7 has an object-side surface S13 and an image-side surface S14, and the optical imaging system has an imaging plane S15. Light from an object sequentially passes through the respective surfaces S1 to S14 and is finally imaged on the imaging plane S15.

In example 8, an effective focal length f of the optical imaging system is 0.75 mm, an on-axis distance TTL from the object-side surface S1 of the first lens E1 to the imaging plane S15 is 5.00 mm, and a maximum field-of-view FOV is 166.0°.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 5.2316 | 0.6000 | 1.74 | 52.3 | −3.60 | 0.0000 |
| S2 | Spherical | 1.7007 | 0.3029 | | | | 0.0000 |
| S3 | Aspheric | 2.6015 | 0.3500 | 1.54 | 56.1 | −1.29 | −0.1689 |
| S4 | Aspheric | 0.5263 | 0.4771 | | | | −0.8837 |
| S5 | Aspheric | 6.6200 | 0.6799 | 1.62 | 23.5 | 6.48 | 99.0000 |
| S6 | Aspheric | −10.6213 | 0.1053 | | | | −89.7006 |
| STO | Spherical | Infinite | 0.0710 | | | | |
| S7 | Aspheric | 0.7816 | 0.6309 | 1.54 | 56.1 | 0.86 | −2.9818 |
| S8 | Aspheric | −0.8260 | 0.0300 | | | | 0.2602 |
| S9 | Aspheric | −3.0497 | 0.2600 | 1.65 | 19.2 | −1.19 | 19.1146 |
| S10 | Aspheric | 1.0958 | 0.1266 | | | | −7.0938 |
| S11 | Aspheric | 0.9300 | 0.4072 | 1.54 | 56.1 | 1.89 | −14.3684 |
| S12 | Aspheric | 8.2264 | 0.0570 | | | | 99.0000 |
| S13 | Spherical | Infinite | 0.2100 | 1.52 | 64.2 | | |
| S14 | Spherical | Infinite | 0.6902 | | | | |
| S15 | Spherical | Infinite | | | | | |

TABLE 16

| Surface number | A4 | A6 | A8 | A10 | A12 | A14 | A16 |
|---|---|---|---|---|---|---|---|
| S3 | 3.2367E−03 | −7.9475E−02 | 5.1288E−02 | −1.0865E−02 | 0.0000E+00 | 0.0000E+00 | 0.0000E+00 |
| S4 | 6.0676E−01 | −1.6495E+00 | 1.4924E+01 | −6.1757E+01 | 1.4455E+02 | −1.4541E+02 | 0.0000E+00 |
| S5 | −4.6627E−01 | −1.9803E−01 | 3.3472E−01 | 0.0000E+00 | 0.0000E+00 | 0.0000E+00 | 0.0000E+00 |
| S6 | −1.1743E+00 | 3.5573E+00 | −7.3212E+00 | 2.6280E+01 | −8.4889E+01 | 1.2472E+02 | 0.0000E+00 |
| S7 | −4.2915E−01 | 2.9737E+00 | −1.4947E+01 | 3.3937E+01 | −2.1808E+01 | 0.0000E+00 | 0.0000E+00 |
| S8 | −1.1140E+00 | 8.2859E+00 | −2.5108E+01 | 3.3639E+01 | −9.3135E−01 | 0.0000E+00 | 0.0000E+00 |
| S9 | −2.3098E+00 | 1.1015E+01 | −4.5823E+01 | 2.0708E+02 | −7.8852E+02 | 1.8199E+03 | −1.7271E+03 |
| S10 | −1.0464E+00 | 4.9497E+00 | −1.8958E+01 | 7.0059E+01 | −1.7736E+02 | 2.4061E+02 | −1.3507E+02 |
| S11 | 9.8219E−01 | −7.5473E+00 | 3.3647E+01 | −1.0377E+02 | 2.0097E+02 | −2.1889E+02 | 1.0188E+02 |
| S12 | −6.3194E−02 | −2.4286E−01 | −2.7122E−01 | 3.8695E−01 | −1.8716E−01 | 2.4297E−01 | 0.0000E+00 |

Figure 16A:
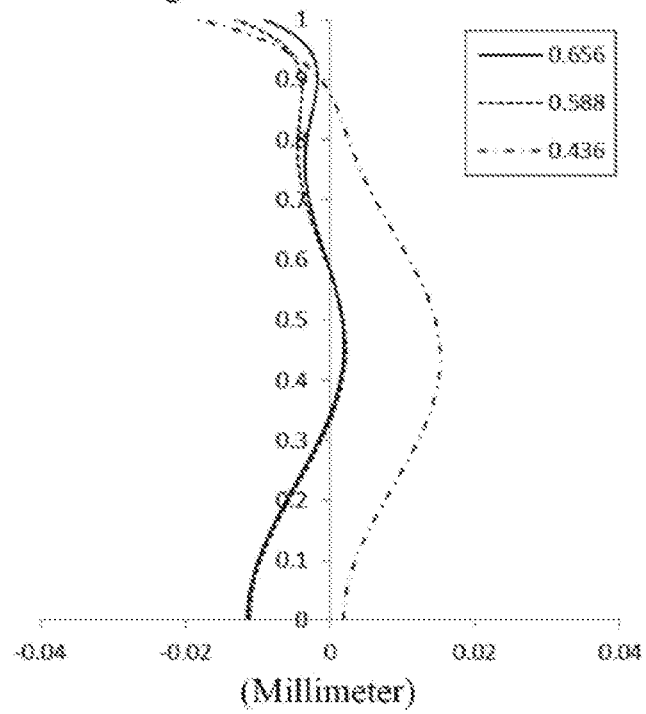
FIGS. 16A to 16D illustrate a longitudinal aberration curve, an astigmatic curve, an f-θ distortion curve, and a relative illumination curve of the optical imaging system of the Example 8, respectively.
Figure 16B:
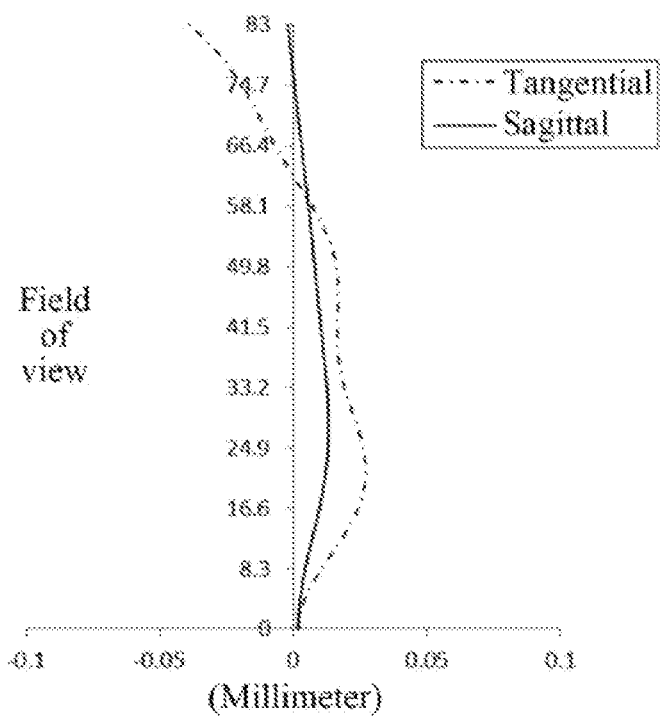
Figure 16C:
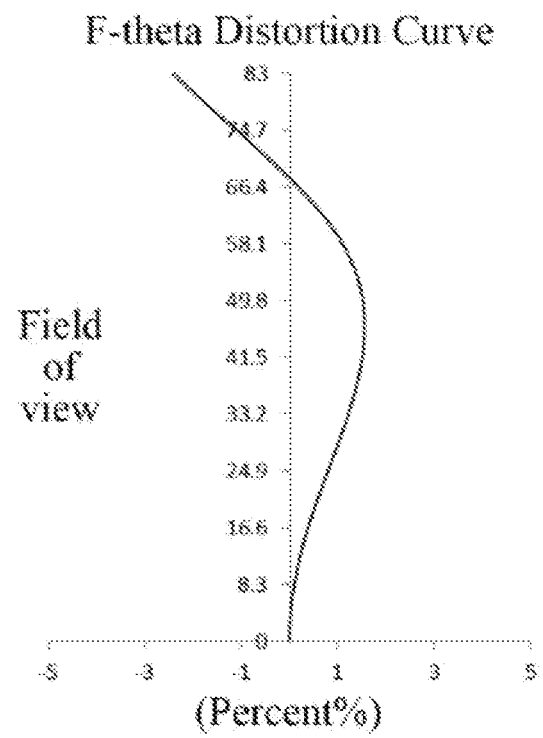
Figure 16D:
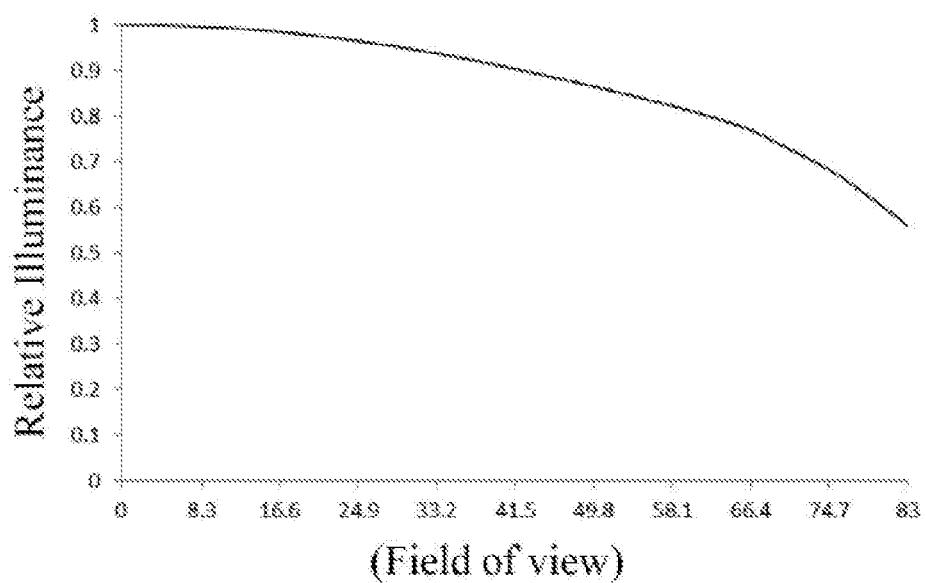

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates an f-θ distortion curve of the optical imaging system according to example 8, representing amounts of distortion corresponding to different field-of-views. FIG. 16D illustrates a relative illumination curve of the optical imaging system according to example 8, representing relative illumination corresponding to different field-of-views. It can be seen from FIG. 16A to FIG. 16D that the optical imaging system provided in example 8 may achieve good image quality.

In view of the above, examples 1 to 8 respectively satisfy the relationship shown in Table 17.

TABLE 17

| Condition/Example | 1 | 2 | 3 | 4 | 5 | 6 | 7 | 8 |
|---|---|---|---|---|---|---|---|---|
| tan(FOV/2)/TTL (mm$^{-1}$) | 1.63 | 1.26 | 1.63 | 1.63 | 1.37 | 1.76 | 1.68 | 1.63 |
| CT1/CT4 | 1.16 | 1.10 | 1.31 | 1.32 | 0.92 | 1.31 | 1.23 | 0.95 |
| f1/f2 | 4.76 | 3.38 | 6.63 | 5.97 | 2.75 | 6.23 | 7.75 | 2.79 |
| f/f1 | −0.14 | −0.17 | −0.11 | −0.13 | −0.21 | −0.12 | −0.10 | −0.21 |
| f/f3 | 0.28 | 0.23 | 0.31 | 0.26 | 0.20 | 0.26 | 0.29 | 0.12 |
| f6/f4 | 1.73 | 1.70 | 1.50 | 1.47 | 2.03 | 1.48 | 1.56 | 2.21 |
| N1 | 1.74 | 1.74 | 1.74 | 1.74 | 1.74 | 1.74 | 1.74 | 1.74 |
| f45/f3 | 1.05 | 0.88 | 1.24 | 0.78 | 0.52 | 0.76 | 0.97 | 0.22 |
| T23/T12 | 1.85 | 1.81 | 1.32 | 1.28 | 1.87 | 1.35 | 1.51 | 1.57 |
| \|(R7 + R8)/(R7 − R8)\| | 0.01 | 0.01 | 0.08 | 0.09 | 0.06 | 0.09 | 0.05 | 0.03 |
| f/R11 | 0.98 | 0.95 | 0.93 | 0.98 | 0.83 | 0.98 | 0.95 | 0.81 |
| SAG12/ET1 | 1.01 | 1.18 | 1.22 | 1.25 | 0.80 | 1.22 | 1.09 | 0.71 |
| SAG22/R4 | 0.92 | 0.90 | 0.92 | 0.92 | 0.86 | 0.93 | 0.89 | 0.81 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, consisting of six lenses sequentially from an object side to an image side of the optical imaging system along an optical axis, wherein
 the first lens has negative refractive power with a convex object-side surface;
 the second lens has negative refractive power;
 the third lens has positive refractive power;
 the fourth lens has positive refractive power;
 the fifth lens has negative refractive power; and
 the sixth lens has positive refractive power,
 wherein tan(FOV/2)/TTL>1.0 mm$^{-1}$,
 0.9≤CT1/CT4<1.5, and
 2.5<f1/f2<8.0,
 where FOV is a maximum field-of-view of the optical imaging system, TTL is a distance along the optical axis from the object-side surface of the first lens to an imaging plane of the optical imaging system, CT1 is a center thickness of the first lens along the optical axis, CT4 is a center thickness of the fourth lens along the optical axis, f1 is an effective focal length of the first lens, and f2 is an effective focal length of the second lens
 wherein one of following conditions is satisfied,
 1.4≤f6/f4<2.5, and
 0.8≤SAG22/R4<1.0, where f4 is an effective focal length of the fourth lens, f6 is an effective focal length of the sixth lens, SAG22 is an on-axis distance from an intersection of an image-side surface of the second lens and the optical axis to a vertex of a maximum effective half-aperture of the image-side surface of the second lens, and R4 is a radius of curvature of the image-side surface of the second lens.

2. The optical imaging system according to claim 1, wherein $-0.3<f/f1<0$,
where f is an effective focal length of the optical imaging system, and f1 is an effective focal length of the first lens.

3. The optical imaging system according to claim 1, wherein $0<f/f3<0.4$,
where f is an effective focal length of the optical imaging system, and f3 is an effective focal length of the third lens.

4. The optical imaging system according to claim 1, wherein the first lens is made of glass material, and $N1 \geq 1.70$,
where N1 is a refractive index of the first lens.

5. The optical imaging system according to claim 1, wherein $0<f45/f3<1.5$,
where f45 is a combined focal length of the fourth lens and the fifth lens, and f3 is an effective focal length of the third lens.

6. The optical imaging system according to claim 1, wherein $|(R7+R8)/(R7-R8)| \leq 0.1$,
where R7 is a radius of curvature of an object-side surface of the fourth lens, and R8 is a radius of curvature of an image-side surface of the fourth lens.

7. The optical imaging system according to claim 1, wherein $f/R11 \leq 1.0$,
where f is an effective focal length of the optical imaging system, and R11 is a radius of curvature of an object-side surface of the sixth lens.

8. The optical imaging system according to claim 1, wherein $0.7 \leq SAG12/ET1 < 1.3$,
where SAG12 is an on-axis distance from an intersection of an image-side surface of the first lens and the optical axis to a vertex of a maximum effective half-aperture of the image-side surface of the first lens, and ET1 is an edge thickness of the first lens.

9. The optical imaging system according to claim 1, wherein $1.0<T23/T12<2.0$,
where T23 is a spaced interval between the second lens and the third lens along the optical axis, and T12 is a spaced interval between the first lens and the second lens along the optical axis.

10. The optical imaging system according to claim 9, wherein $2.5<f1/f2<8.0$,
where f1 is an effective focal length of the first lens, and f2 is an effective focal length of the second lens.

11. The optical imaging system according to claim 9, wherein $-0.3<f/f1<0$,
where f is an effective focal length of the optical imaging system, and f1 is an effective focal length of the first lens.

12. The optical imaging system according to claim 9, wherein $0<f/f3<0.4$,
where f is an effective focal length of the optical imaging system, and f3 is an effective focal length of the third lens.

13. The optical imaging system according to claim 9, wherein $1.4 \leq f6/f4 < 2.5$,
where f4 is an effective focal length of the fourth lens, and f6 is an effective focal length of the sixth lens.

14. The optical imaging system according to claim 9, wherein the first lens is made of glass material, and $N1 \geq 1.70$,
where N1 is a refractive index of the first lens.

15. The optical imaging system according to claim 9, wherein $0<f45/f3<1.5$,
where f45 is a combined focal length of the fourth lens and the fifth lens, and f3 is an effective focal length of the third lens.

16. The optical imaging system according to claim 9, wherein $|(R7+R8)/(R7-R8)| \leq 0.1$,
where R7 is a radius of curvature of an object-side surface of the fourth lens, and R8 is a radius of curvature of an image-side surface of the fourth lens.

17. The optical imaging system according to claim 9, wherein $f/R11 \leq 1.0$,
where f is an effective focal length of the optical imaging system, and R11 is a radius of curvature of an object-side surface of the sixth lens.

* * * * *